United States Patent [19]
Rabne et al.

[11] Patent Number: 6,006,332
[45] Date of Patent: Dec. 21, 1999

[54] RIGHTS MANAGEMENT SYSTEM FOR DIGITAL MEDIA

[75] Inventors: Michael W. Rabne, Cleveland; James A. Barker, University Hts.; Tareq M.T. Alrashid; Brian S. Christian, both of Cleveland; Steven C. Cox, University Hts.; Elizabeth A. Slotta, Cleveland Hts.; Luella R. Upthegrove, Boardman, all of Ohio

[73] Assignee: Case Western Reserve University, Cleveland, Ohio

[21] Appl. No.: 08/975,896

[22] Filed: Oct. 21, 1997

Related U.S. Application Data

[60] Provisional application No. 60/029,135, Oct. 21, 1996.

[51] Int. Cl.$^6$ ........................................ H04L 9/00
[52] U.S. Cl. ..................... 713/201; 709/229; 709/250; 380/4
[58] Field of Search ................................... 713/201, 200, 713/202; 709/203, 219, 225, 232, 250, 229; 380/4, 23, 25

[56] References Cited

U.S. PATENT DOCUMENTS

| | | |
|---|---|---|
| 4,977,594 | 12/1990 | Shear . |
| 5,050,213 | 9/1991 | Shear . |
| 5,218,637 | 6/1993 | Angebaud . |
| 5,379,423 | 1/1995 | Mutoh et al. . |
| 5,410,598 | 4/1995 | Shear . |
| 5,438,508 | 8/1995 | Wyman . |
| 5,444,779 | 8/1995 | Daniele . |
| 5,506,961 | 4/1996 | Carlson et al. . |
| 5,542,046 | 7/1996 | Carlson et al. . |
| 5,629,980 | 5/1997 | Stefik et al. . |
| 5,634,012 | 5/1997 | Stefik et al. . |
| 5,638,443 | 6/1997 | Stefik et al. . |
| 5,646,999 | 7/1997 | Saito . |
| 5,673,322 | 9/1997 | Pepe et al. .................................. 380/49 |
| 5,708,709 | 1/1998 | Rose ............................................. 380/4 |
| 5,765,152 | 6/1998 | Erickson ..................................... 707/9 |

OTHER PUBLICATIONS

Electronic Book Technologis, Inc., "Electronic Book Technologies Announces CADleaf Graphic Workbench and FIGleaf Plus", Business Wire, Sep. 1995.

Maximized Software, "Maximized Software Releases Web-Juggler(TM) Web Server Utility Module", Business Wire, Aug. 1996.

Balderston, "Microsoft Fills Out Web Server with Denali", InfoWorld, v18, n38, p.16(1), Sep. 1996.

*Primary Examiner*—Robert W. Beausoliel, Jr.
*Assistant Examiner*—Scott T. Baderman
*Attorney, Agent, or Firm*—Fay, Sharpe, Fagan, Minnich & McKee, LLP

[57] ABSTRACT

A system is provided for controlling access to digitized data. An unsecure client is provided with a launch pad program which is capable of communicating with a secure Rights Management (RM) server. The launch pad program provides an indicator to a public browser, used by the unsecured client, which acknowledges when a rights management controlled object is detected. Once a rights management object is detected, operational control is transferred from the public browser to the launch pad. The launch pad will communicate with the secured RM server and request the digitized data corresponding to the controlled object. In response thereto, the RM server identifies the type of data being requested, i.e. text, audio, video, etc. and transmits this information to the launch pad. The launch pad then searches whether a secure RM browser appropriate to handle this data is resident on the client. When it is determined that no RM browser is resident, the launch pad requests an appropriate browser from the RM server. Based on this request an appropriate RM browser is obtained and authentication and security information are inscribed. Thereafter the RM browser is transmited to the client. Prior to use, an authentication procedure is undertaken between the launch pad and the RM server to authenticate the RM browser. If authentication does not occur within a predetermined time period, the browser expires.

19 Claims, 15 Drawing Sheets

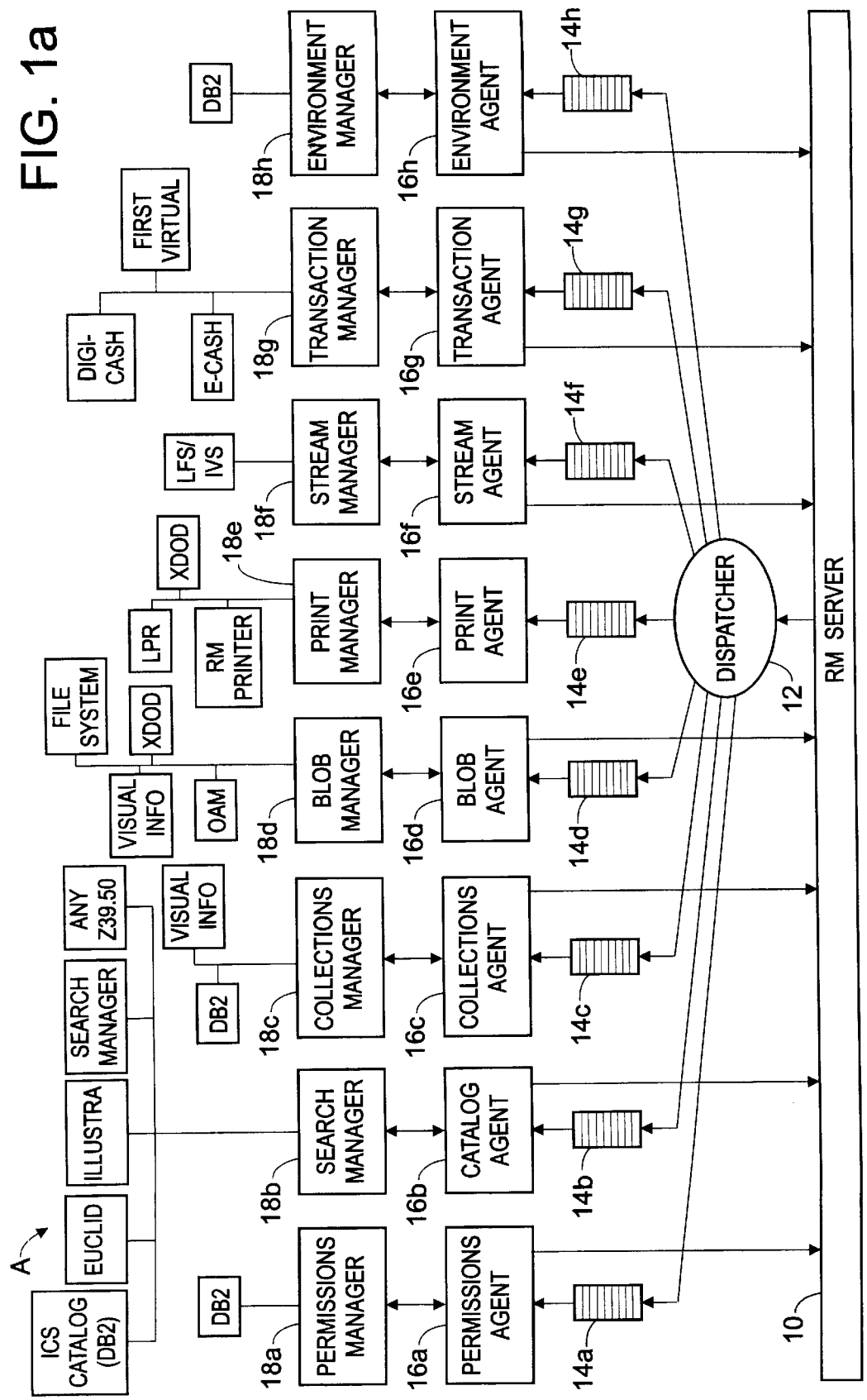

CODE TEMPLATE

```
if ( registerProtocolWithWWW() < > 0 )
   {
      displayMessage('Failed to Register RM schema...')
      close()
   } while TRUE
   {
      switch(event)
      }
         openMessage:
         openURL ( URL ) browserClosedMessage:
         closeBrowser ( browserid ) closeLaunchpad:
         close()
      }
   }

/* Event Handlers */ openURL( URL)
   {
      ret = rmParseURL( URL, &holdingID, &elementID )
      if (elementID = NULL)
         ret = rmQueryHoldingType( holdingID, &type )
      else
         ret = rmQueryElementType (holdingID, elementID, &type)
         tableEntry = browserTableLookup( type )
      if (tableEntry = NULL)
         {
            /* Must Launch Browser */
            ret = rmLaunchBrowser( type, &browserID, URL )
            if (ret = 0) addEntryToTable( type, browserID )
         }
         else
            /* Browser already running; just send a message */
            sendMessage(tableEntry.browserID, 'openURL', URL)
   } closeBrowser( browserID )
   {
      tableEntry = browserTableLookup( browserID )
      removeEntryFromTable( tableEntry )
   } closeLaunchpad()
   {
      closeWindow()
   }
```

FIG. 4

RMc BROWSER CODE TEMPLATE

```
/* Initialize and Authenticate Browser */
holdingID = argv[1]
elementID = argv[2]
rmInitialize()
if (rmAuthenticateBrowser() <> 0)
   {
      messageBox('Browser Authentication Failed')
      closeBrowser()
   }

/* Startup Sequence */
openWindow()
focus = 0
downLoad(holdingID, elementID)
setGUIElements()
rmLongCopyrightDialog( rmElement[focus] )
displayShortCopyright( rmElement[focus].shortCopyright )

/* Startup Use */ if (checkStartupUse() = TRUE)
   {
      rmHandleDisplay( rmElement[focus] )
   }

/* Event processing loop */
while true
   {
       switch(event)

/* RM events */
       print: rmHandlePrint( rmElement[focus] )
       clip: rmHandleClip( rmElement[focus] )
       download: rmDownload( rmElement[focus] )

/* Other events */
       close: rmClose()
       openURLMenuItem: open()
       openFromLaunchPad: openFromLaunchPad()
       changePasswordMenuItem: rmChangePassword()
       setApprovalMenuItem: rmChargeApprovalSettingsDialog()

displayRightsMenuItem: rmDisplayPermissionsDialog()
    }

/* RM Event Handlers */ rmHandleDisplay( rmElem )
{
   if (ret = rmCheckPermission( rmElem, RM_USE_DISPLAY) <> RM_OK)
      {
         messageBox('Permission Denied')
         return
      }
   if (ret = rmReportUse(RM_TRANSACTION_BEGIN, rmElem, RM_USE_DISPLAY) <> RM_OK)
      {
         if (ret = RM_ERROR_CHARGE_DECLINED)
            {
               rmReportUse(RM_TRANSACTION_DECLINE, rmElem, RM_USE_DISPLAY)
               return
            }
         else
            return
```

```
            else
              {
                rmElementOpen( rmElem, 'r' )
                rmElementLength( rmElem, &length )
                rmElementRead( rmElem, &buffer, length )
                if (ret = display(window, buffer) . 0 )
                   rmReportUse(RM_TRANSACTION_ABORT, rmElem, RM_USE_DISPLAY)
                else
                   rmReportUse(RM_TRANSACTION_COMMIT, rmElem, RM_USE_DISPLAY)
              }
}

/* Other Functions */ closeBrowser()
    {
       rmCloseBrowser() /* RM Server */
       RM_CloseBrowser(browserid) /* LaunchPad */
       closeWindow()
    } openFromDialog()
    {
       openURLDialog( url )
       sendMessage(LaunchPad, 'open', url)
    } openFromLaunchPad()
    {
       recieveMessage(LaunchPad, 'open', holdingID, elementID)
       download( holdingID, elementID )
       setUIElements()
       displayLongCopyrightDialog( rmElement[next] )
       displayShortCopyright(shortCopyright)
    } setGUIElements()
    {
       if (rmCheckPermission(rmElement[focus],   RM_USE_DISPLAY) <> RM_OK)
          disable(displayWidget)
       else
          enable(displayWidget)
       if rmCheckPermission(rmElement[focus],   RM_USE_DOWNLOAD) <> RM_OK)
          disable(downloadWidget)
       else
          enable(downloadWidget)
          .
          .
          .
    } downLoad( holdingID, elementID )
    {
       focus++
       while
       (ret = rmGetElement(holdingID, elementID, &rmElement[focus]
       if (ret = RM_ERROR_PERMISSION_DENIED)
          rmLogonUser()
       else
          handleException(ret)
    }
}
```

A HOLDING RULE EXAMPLE

58 — RULE SPECIFICATION AND EVALUATION CRITERIA:

HOLDING ID: 234567678

USER - ID: ANY

USER CATEGORY: ART HISTORY FACULTY

IP ADDRESS PROFILE: OHIOLINK AFFILIATE INSTITUTION

EFFECTIVE DATE: 1/1/96 - 12/31/96

USAGE TYPE: DOWNLOAD

MIME TYPE: IMAGE

TRANSMISSION PROFILE: SSL64

PROTECTION PROFILE: RMc V1.0

RATE TYPE: ROYALTY; RATE: $01.500

FIG. 11

RIGHTS MANAGEMENT SYSTEM FOR DIGITAL MEDIA

This application claims priority to U.S. provisional application No. 60/029,135, filed Oct. 21, 1996.

BACKGROUND OF THE INVENTION

The present invention relates to the transfer of intellectual property in the form of digital information. The invention finds particular application in the protection of intellectual property distributed in electronic format through a distributed computer network such as the internet, and will be described with particular reference thereto.

The electronic environment is rapidly facilitating the creation, storage and distribution of intellectual properties. As ease of access to these properties increase, so does the demand of the owners and/or distributors of this property to protect its integrity, and the interests of the creators. Security of the digitized intellectual property is of great concern to publishers who are interested in the internet as a new publishing medium, as it has been shown the technology which facilitates operation of the internet also facilitates mis-use and/or mis-appropriation of intellectual property.

A person wishing to mis-use digitized intellectual property will be able to intercept the material on the internet, on an intranet, and/or at an end-user's computer. Also, given enough computing time, cryptographic envelopes containing intellectual property can be broken. The length of time required is proportional to the length of the key. A 40-bit DES key may require several days or weeks of compute time but a 128-bit RC4 key may require tens or hundreds of years. If the key is embedded in a browser, the attacker will opt to extract the key and avoid the brute force search of keyspace.

In this regard, with existing World Wide Web (WWW) browsers, once the intellectual property leaves the WWW server, a WWW browser is not obligated to enforce any rights with respect to the intellectual property. A user may freely save, print, or copy to a clip-board. thus, the internet, and especially the World Wide Web (WWW), have made distribution of digitized printed materials a trivial exercise. The academic and publishing communities among others, are therefore rightly concerned about the mass distribution of data which has been neither editorially scrutinized, nor subjected to peer review. Further, intellectual property rights holders are concerned about the potential for illegal re-distribution or unauthorized use of their copyrighted materials, and the right to be duly compensated for legal use of their materials. They also have a desire to exercise control over how their intellectual property may be re-used by others.

Thus, fundamental to the creation, maintenance and use of an on-line multi-media repository, such as an electronic library, are the issues of intellectual property ownership, protection and use compensation. The long term success of the library of the future is directly connected to the ability of computer systems to address these fundamental issues.

It is therefore considered desirable to provide a system of rights management protection which allows intellectual property owners to follow their property onto the internet. In investigating the issues surrounding this topic, the inventors gathered primary requirements for such a system from publishers and librarians. Organizations and individuals in these categories are crucial to the existence and successful operation of an electronic library. Interviews were also conducted with rights reproduction organizations (RROs), attorneys, auditors and patrons. The participants recognize the advent of new technologies offers new ways to disseminate information and manage its uses. In gathering requirements for a system, it became apparent those interviewed were familiar with the existing issues. They also accepted the pivotal roll of copyright law in the reproduction and distribution of copyrighted works, while understanding that the law has not addressed many of the issues facing those who create and distribute the digitized works.

Publishers, who hold most rights to printed materials, require that ownership of intellectual property be carried into the electronic world, and that the electronic version of each work is protected from tampering, unauthorized and illegal copying and distribution. Proper compensation must be made to rights-holders for use of their materials.

In order to execute these mandates, the owners/operators of the electronic library and the rights-holders whose work is to be digitized need to enter into a license agreement that among other concepts:

identifies the owner of the materials;

identifies the material that will be digitized and stored in the library, repository, etc.; specifies the parameters for the use of the material; provides general guidance as to how the material may be scanned, stored and presented; stipulates compensation due the rights-holder; and, defines the duration of the license.

Further, requirements of the publishers include:

the license agreement data be stored in a secure and protected database;

the permissions parameters be enforced for each access of the intellectual property;

permissions rules governing their holdings be available to the rights-holder at all times; and, appropriate controls be implemented to ensure the integrity of all system data (both permissions, rules and the digitized intellectual property).

Librarian requirements focus on creating digitized holdings that are locatable and searchable, and also allow for patron privacy. Librarians identified the Machine Readable Catalog (MARC) as the protocol of choice for cataloging. They also required that full-text search capability be implemented for text holdings. Unless billable charges occur, the system must protect patron privacy, as is now done in the traditional library setting.

Both publishers and librarians desire that statistics be collected regarding usage. For example, tracking various categories of users which are accessing the materials. This information will allow publishers to establish trends and will also be beneficial to library staff to plan acquisitions. Such a system should also be able to produce reports as requested by licensors and administrators.

To address these issues, the inventors have reviewed existing technology, including browsers which are capable of simultaneously rendering multi-media intellectual property into a variety of presentation formats specific to the type of property (i.e. text, image, audio, video, etc.). It has been noted that although browsers and intellectual property have traditionally been separate entities in rights management systems, it may be desirable to have intellectual property and the corresponding rights embedded in a browser executable program as data, in such a way that a browser must be executed to make use of the intellectual property.

A previously noted important aspect of existing WWW browsers, which function in a Hyper-Text-Mark-Up Language (HTML) environment, is that once the content leaves a WWW server, the WWW browser is not obligated to enforce any rights with respect to the intellectual property. Particularly, such a browser freely saves, prints or copies downloaded information. The present inventors have, therefore, considered that it may be beneficial to provide an additional browser configuration that a server trusts to accept intellectual property along with the associated rights, and which will enforce the rights. If the server is to be able to trust that the additional browser is authentic and not an imposter program which will violate the rights, the server must have means of authenticating the browser.

With attention to authenticity, the inventors believe at least two issues must be addressed. First, if the browser was created by a third party outside of the control of the server, there is no guarantee that the rights will be enforced. Second, if the browser was created by the server and sent to the end-user computer the user may be able to modify the browser to disable rights enforcement or to discover keys to intellectual property cryptographic envelopes.

Therefore, the inventors have considered it to be beneficial, in order to reduce the risk of attacks against a browser while resident on the end-user computer, to have the server impose a finite lifetime for a given browser to be trusted, after which the browser expires and a new instance of the browser must be downloaded from the server. It has been considered that the expiration interval may vary according to the browsers destination and/or environment. Thus, if the end user is from an arbitrary internet address, the interval may be kept short due to a lack of trust, however, if the destination environment is, for example a student computer on a campus intranet or a secure library workstation, the interval may be longer.

Thus, the present invention is directed to providing library functions relating to the acquisition, mounting, access, distribution, and use of intellectual properties in electronic form. The system will exercise server, workstation and network hardware and software, and implement applications designed to control and monitor the access and use of licensed intellectual property.

A formal license agreement between the inventors or users of this system and the intellectual property rights holder will be executed before the intellectual property is digitized for presentation in the system. Each license agreement will contain two equally binding components:

the legal language of the agreement; and, the list of parameters defining rules for storage, use and access to the electronic intellectual property, as well as royalties for compensation to the rights-holders.

SUMMARY OF THE INVENTION

In accordance with one aspect of the present invention, an intellectual property rights management system for use in a distributed network such as the internet is provided. The rights managements system provides a manner of transferring from a standard web HTTP Universal Resource Locator (URL) to a Rights Management (RM) URL environment. Wherein a launch pad program on a client contacts a RM server to determine the request. Further provided from the RM server is an appropriate type RM browser supplied to the client.

In a more limited aspect of the invention, the RM browser once sent to the client is required to provide an immediate (i.e. timed out) authentication to the RM server, is a browser which has a limited defined life (i.e. will time out after a certain predetermined time) and is removed from the client workstation upon a termination of use.

In another aspect of the invention, the system has the ability to bring in external groups of users without requiring storage of each user's identification (ID) in the rights management system.

With attention to another aspect of the present invention the trusted client workstation not only deals with permissions of use but enforces the functionality that is available to a user. Further, a usage history which is communicated to a serve is provided for tracking usage in the system.

A further aspect of the present invention is provision of a processing profile which will specify, on the outbound side, the manner in which the digitized data is sent including the level of security in the exchange from the server to client.

Still a further aspect of the present invention is provision of an architecture that allows for multi-repositories, wherein the system provides protection to properties across a wide variety of repositories when required and such protection is only active when invoked.

Yet another aspect of the present invention is the categorization of licensees into a plurality of categories having different licensing agreements and a filtering of those agreements to obtain an appropriate best licensing right scenario for a user.

BRIEF DESCRIPTION OF THE DRAWINGS

The invention may be embodied in various steps and arrangements of steps in various components and arrangements of components. The drawings are only for purposes of illustrating a preferred embodiment and are not be construed as limiting the invention.

FIG. 1a illustrates an overall Rights Management (RM) system architecture;

FIG. 4 sets forth a template for the conversation between the launch pad and an RM server;

FIGS. 6a–6b sets forth a template for the conversation between the RMc browser and the RM server of FIG. 5;

FIG. 11 is a first holding rule example according to the example of the operation of the present invention;

DETAILED DESCRIPTION OF THE PREFERRED EMBODIMENT

1. Definition/Descriptions

2. Overview

Figure 1B:
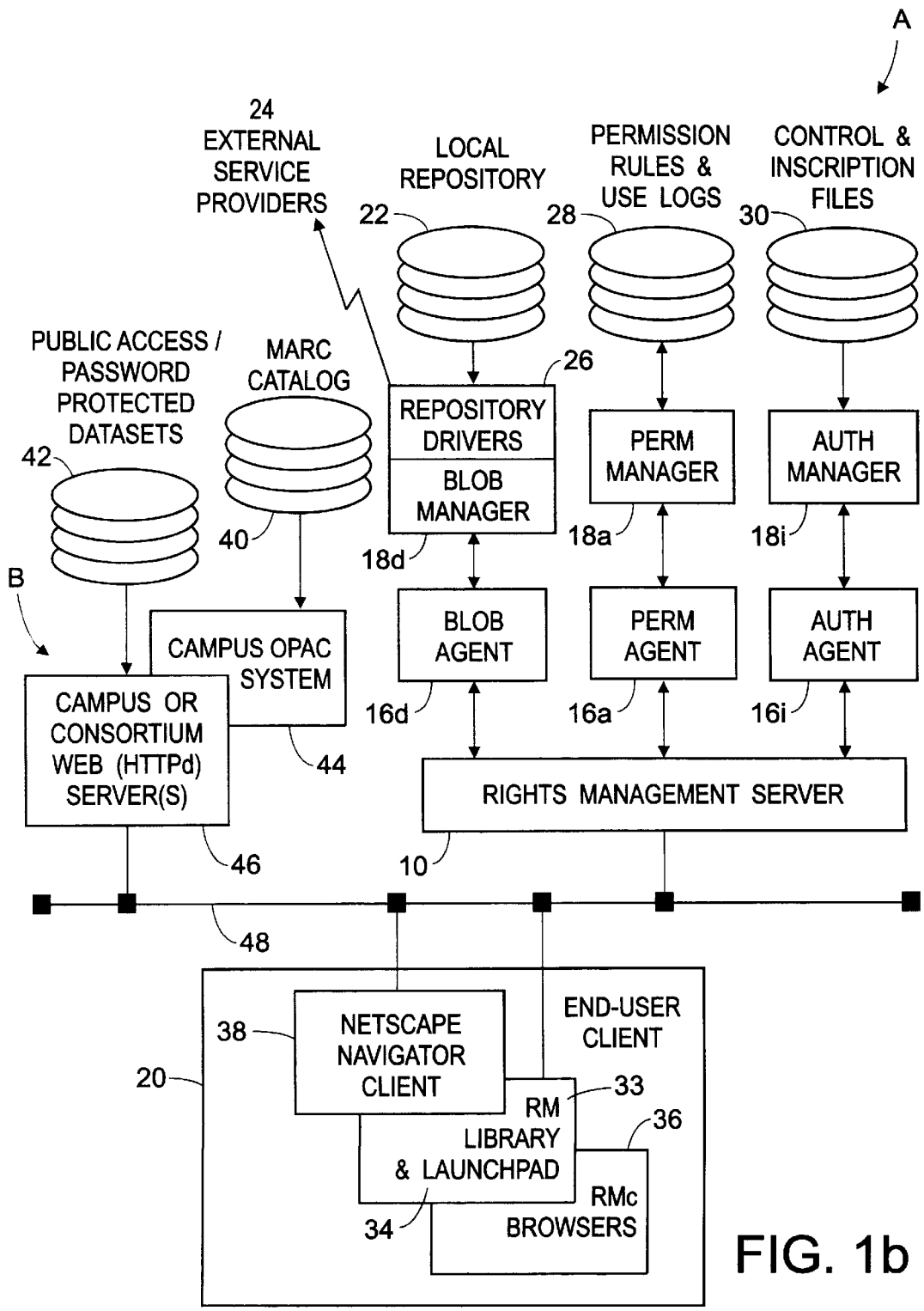
FIG. 1b details an overview of a portion of the RM system interconnected to a public electronic information network.

2a. Launch Pad
2b. Browser Acquisition
2c. Browser Authentication
2d. RMc Browser Operation
2e. Launch Pad Responses
2f. Encryption/Security
2g. Event Processing
2h. Exception Handling
2i. Miscellaneous Implementation Requirements
3. Discussion/Example
1. Definition/Descriptions Professional Librarians and archivists have developed procedures to address the acquisition, cataloging, preservation and presentation of materials within a library setting. The present invention, which is described herein as a Rights Management (RM) system models these existing systems while adding the functionality required to support the storage, protection and presentation of digitized materials which are to be distributed in electronic form.

To assist in at further discussion of the present invention, the inventors believe it would be beneficial to define/describe various concepts/components. Particularly:

Holdings: In a library or archive, the smallest unit that is catalogued is usually called a holding. Due to the rigors of comprehensive cataloguing, a holding may be more than one physical object. A set of slides, or a kit containing several surgical knives may be considered a single holding for catalogue and administration purposes.

In the presently preferred embodiment of the RM System, a holding is the administrative unit used to link together the digitized pieces of an intellectual property, the system data required to accurately present it, and the permissions rules needed to protect it. Giving the intellectual property a unique identifier (HOLDING ID) serves as a handle for the retrieval of the digitized data which may be resident on any of a number distributed data repositories used by the RM system, and as a pointer into online RM Catalogue and Collection navigational databases.

Elements: The HOLDING ID is used for the high-level administrative tracking and retrieval of an intellectual property. But presentation, permissioning, and requirements for compensation demand a finer granularity. Therefore, each holding is further broken down into a series of elements. As an example, an electronic book may contain text, color images, and hyperlinks, each governed by a different set of permissions rules. Each of these components would be considered an element of a holding, and the use of each could involve different charges, with the printing of a color image perhaps costing more than printing a page of text.

An element (which is identified by its ELEMENT ID) may be thought of as the smallest independently presentable piece of digital intellectual property which is also independently stored. For example, though a single text character is certainly independently presentable, it is not likely that each character in a book would be stored separately. Alternatively, we may think of an image as being a single presentable unit, but a single image may be rendered many different times for efficient display on a variety of different monitors. Each rendering of an image is a unique element in the RM System.

Catalogue: Catalogues contain standardized bibliographic information (subject, author, title) about holdings available or known to a library.

Library patrons access a catalogue when they have a fairly good idea what they are looking for, and simply want to know if it is available in a specific location or format. The rigorous standards enforced by professional catalogues have resulted in an enormous body of searchable bibliographic information. Researchers can perform sophisticated searches across electronic catalogues from many libraries, locating materials in their area of interest. If they need to obtain materials from a remote library, inter-library loan services can have the desired items delivered to the local library in a matter of days (or faxed in a matter of minutes)

In the present: RM system, a RM Catalogue contains searchable bibliographic information.

Collection: Sometimes a library end user is not in search of a specific item—they want to "see what all is available" or just browse the library. Also, the non-trivial nature of catalogue searches can be intimidating to inexperienced or non-technical patrons.

Additionally, many types of intellectual properties do not warrant the creation of a rigorous catalogue database entry. (It may take an experienced professional cataloguer an hour or more to generate a single new catalogue entry from scratch).

For the above situations, a folder-based hierarchy is a more appropriate way for end users to access library materials. Database entries required to support such a hierarchy are much simpler than the rigorous catalogue, and can be created quickly by collection administrators. End users are presented with an intuitive screen full of descriptively named folders, which together comprise the "library at a glance."

In the present RM system, a RM Collection is the folder-based hierarchical presentation of library materials.

Rights Manage Compliant Browsers: Publishers expressed a need to protect intellectual property once it has been transmitted from a trusted server (i.e. RM server) to a user's workstation. The workstation must therefore contain a trusted program that can securely receive intellectual property, prevent unauthorized uses of it, and report all authorized uses to the RM server. Applications that adhere to these security principles are referred to as Rights Manager-compliant (RMc). The RM Server and RMc browsers communicate with a protocol that specifies the format of commands that are exchanged and the security measures required to protect intellectual property. Communications between the RM server and any RMc browser must be encrypted to protect the intellectual property during network transmission.

Since the RMc browsers must be authenticatable at the workstation, the RM server stores the RMc browsers and downloads them to the user workstation on demand. The RMc browser of the present preferred embodiment must be executed immediately to be authenticated or it will expire. Also every RMc browser is configured to expire after a RM server-defined period of time.

The only way to access the many types of information available from the RM server is via an RMc browser application. Each RMc browser may handle a single simple content type (text, image, audio, video, catalog, collection), or multiple simple types. RMc browsers may also present complex content types composed of a holding of heterogenous elements (e.g., Musical Scores, Art Museum material, class syllabus, scientific journals).

RM Launch Pad: The RM launch pad enables unsecure WWW browsers to initiate user access to the RM server. Upon startup, the RM launch pad registers an RM URL with the active Web browser. If the WWW browser encounters an RM URL, it forwards that URL to the launch pad application for processing. The launch pad determines what kind of browser or browsers are required to process the requested URL. The appropriate RMc browser is downloaded to the workstation, and the RM launch pad passes execution control and the requested holding and/or element data to the RMc browser.

RM Server: The RM server is responsible for downloading RMc browsers to user workstations, servicing requests from RMc browsers, enforcing access control to intellectual property, and logging all authorized uses of intellectual property.

Encrypted RMc browsers are downloaded to the user workstation with a Kerberos-like sealed ticket embedded in the executable code. The RM server authenticates every request that comes from an RMc browser by means of this ticket which expires at a RM server-determined interval. Once the RMc browser is authenticated, the RM server parses and processes the browser request, encrypts the results, and forwards them back to the RMc browser. Permission rules are maintained on the RM server to govern the uses of the intellectual property by the library patrons. Every use of intellectual property is logged by the RM server.

Catalogue Access: One of the major historical challenges concerning the administration of a large body of data is how to organize that body in such a way that you could search it quickly and effectively to determine its content. The body of data contained in the RM system presents the same challenge.

Librarians began in the late 1960's to develop standards for growing bibliographic catalogues, denoting what information should be entered for a new holding (the MARC record format), how a MARC record could be transferred between two catalogues to eliminate duplicate cataloguing (the Z39.2 format), and standard rules on how to enter that information, known as the Anglo-American Cataloguing Rules (AACR—since enhanced into the rule set known as AACR2).

Today many of these bibliographic catalogues contain millions of MARC records, with a wealth of detail about their holdings. The information organization and content standards were soon followed by standards governing its online access and retrieval. In 1985 a National Information Standards Organization NISO subcommittee was established to create the retrieval standard, and in 1988 a version 1 of Z39.50 was ratified. Since then, two more versions have passed, version 2 in 1992, and version 3 in June 1995. Version 2 of the Z39.50 Standard is available in paper format from the NISO Press Fulfillment Office in Oxon Hill, Md. Version 3 is available electronically via anonymous ftp at ftp.loc.gov/pub/z3950.

The RM Server integrates these existing legacy bibliographic catalogues. Pointers to the RM system are added to the holding's existing MARC record. The pointers are located in the 856 field in the MARC record, known as the "Electronic Location" field.

Users may directly access the bibliographic catalogue via an HTML (WWW) form which allows them to perform a traditional Title, Author, Subject, or keyword searches. If their search is successful, the list of MARC records which meet their search criteria are returned to the WWW browser. If an RM version of the holding exists, the user has the option of selecting the pointer to the RM Holding. Doing so passes control to the launch pad application.

Collection Access: As previously noted, RM holdings are also retrievable via a folder-based hierarchy of information, which allows patrons to navigate through RM holdings in their area of interest. This collection information is accessible via any available WWW browser (such as Netscape or Mosaic). The RM system supports creation, maintenance and retrieval of the HTML data required to display the RM collection.

Collection access is provided for holdings whose organization is inappropriate for rigorous permanent cataloguing. For example, their life cycle may be very short. Holdings such as digitized class notes, homework solutions, and other course materials are examples of such short-term holdings.

Digital Object. Storage: The RM system supports multiple distributed data repositories. The RM server processes requests from the RMc browsers. It determines which of its repositories contains the physical data, and transmits the data to the requesting workstation.

Permissions: The RM server maintains and processes rule-based intellectual property permissions. Permissions data, as specified in the license agreement, is stored in a secure, auditable database. When a request for access is received from the RM server on behalf of a user, the RM server examines its database. If the user has permission to view the data, the RM server returns the permissions relevant to that user along with the requested holding element data.

RM server databases include the permissions rules, files containing identification of library holdings and their component elements, license agreement information, and licensor and user profile data.

RM Holding Acquisition: Receipt of license agreements along the lines previously described is the first step in the RM workflow process.

When an intellectual property is received for processing, it is first assigned a unique HOLDING ID. The holding and its presentation requirements are then analyzed to determine how many and what types of elements the holding will require. Each element is assigned a unique ELEMENT ID which together with the HOLDING ID is used throughout the acquisition process.

Based on the analysis and the license agreement, a set of rules, defined in the present embodiment as Permissions Manager rules, governing each element's authorized uses and rates are entered into the RM system.

The completion entry of the Permissions Manager rules generates a multi-part work order:

i. A first work order specifies the digitization methods required for each element;

ii. A second work order specifies all of the information necessary to add the holding to the RM collection hierarchy;

iii. The third work order contains all of the information necessary to link a local system's MARC record to the new RM holding.

A final process checks to ensure all required workflow processes have been completed for each element in a holding. When all of the required updates have been made, the newly created holding's data is permanently stored into an RM library, updates are made to production Catalogue, Collections, and Permissions databases, and the holding is made available to RM system end users.

Rmlib: Rmlib is a link library which provides an application programming interface (API) to encapsulate RM protocol communications with the RM server, user authentication, browser authentication, and intellectual property cache management. RMLib is linked into every RMc browser, and its functions are implemented in a very specific fashion.

RMcBrowser Functions in RMLIB: RMLIB is a runtime function library that implements the Rights Manager Protocol (RMP), which defines the commands used to transmit and control the use of intellectual property over the internet. RMLIB includes constants, type definitions, functions, resources, and global variables. The resources include dialogs for standard features such as user logins and charge approval settings. The definitions include C language structures for elements and rights. RMLIB global variables hold element information, authentication information, and other application settings. RMLIB includes 3 categories of commands: Launch pad to Server, Browser to Server, and Browser Internal. The functions contained in this library are fundamental to Rights Manager Compliance.

Launch pad functions in RMLIB: RMLIB includes several functions which must be implemented properly in the RM launch pad including:

rmParseURL rmQueryElementType rmQueryHoldingType rmLaunchBrowser

Browser to Server commands: The Browser to Server commands report and request information to and from the RM Server. The commands received by the server follow the Rights Manager Protocol (RMP). It is critical that these functions are implemented properly within an RMc browser, since they perform authentication, transmit intellectual property, and report IP uses. These commands include:

Authentication Commands rmAuthenticateBrowser rmchangePassword rmLogoffUser rmLogonUser Intellectual Property Management Commands rmAbortGetProgressive rmBeginGetProgressive rmNextGetProgressive rmcloseBrowser rmGetElement rmGetElementChunk rmReportUse Browser Internal commands: In addition to the client-service interface to the RM Server, there are several RMLIB commands that are used for internal IP management and standard browser features. It is important that these functions be integrated properly within an RMc browser. These functions include:

IP Management Commands rmcheckPermission rmElementClose rmElementDestroy rmElementLength rmElementOpen rmElementRead rmInitialize Browser Features rmchargeApprovalSettingsDialog rmDisplayPermissionDialog rmLongCopyrightDialog rmQueryCharge;

2. Overview

FIG. 1a sets forth an overall Rights Management (RM) system A architecture according to the teachings of the present invention. This figure illustrates the architecture in the RM environment, showing the components associated with RM server 10. Particularly, a dispatcher 12 is operationally connected to a plurality of queues 14a–14h. Associated with queues 14a–14b are pairs of agents and managers which allow for the operation of RM system A. Among the associated agent and manager pairs are the permissions agent 16a, permissions manager 18a, catalog agent 16b and search manager 18b, collection agent 16c and collections manager 18c, a binary large object (BLOB) agent 16d and a BLOB manager 18d, a print agent 16e and print manager 18e, a stream agent 16f and stream manager 18f, a transaction agent 16g and transaction manager 16g and an environment agent 16h and environment manager 18h. Associated with the previously described managers are various sub-programs operating in association with a corresponding manager.

More particularly to the present invention, FIG. 1b details an overview of a portion of RM system A interconnected to a public electronic information network (e.g. internet) system B.

Elements in FIG. 1b which are the same as FIG. 1a are similarly numbered. Intellectual property, in the form of system A can be delivered to a secure client workstation 20 —which prior to application of the present concepts was considered an unsecure (client—in accordance with previously agreed to terms and use conditions. The intellectual property within RM system A may be held in a local repository 22 or be obtained from an external service provider 24 accessible by RM system A. A repository driver 26 is provided with BLOB manager 18d to obtain, when necessary, intellectual property stored at local repository 22 and/or service provider 24. As will be described in greater detail below, permission rules and use logs 28 operate in conjunction with permissions manager 18a and permissions agent 16a. Further, control and inscription files 30 are in operative connection with authentication manager 18i and authentication agent 16i.

Client workstation 20 is configured with launch pad application 34 and RMc browsers 36 (which were downloaded from RM server 10), each which contain RMLIB 33, and a WWW browser 38 such as, for example, Netscape Navigator or MS Internet Explorer. The WWW browser 38 is used to communicate via existing internet protocol with external databases such as MARC catalog 40 and other public access/password protection data-sets 42. In this present embodiment, internet environment B is configured so that MARC catalog 40 and datasets 42 are in communication with the client workstation 20 through access systems 44 and 46 which interconnect to a communication line 48. Access systems 44 and 46 may, in one embodiment, be a university or corporate system with Web (HTTPd) servers which includes existing data security systems.

Figure 2:
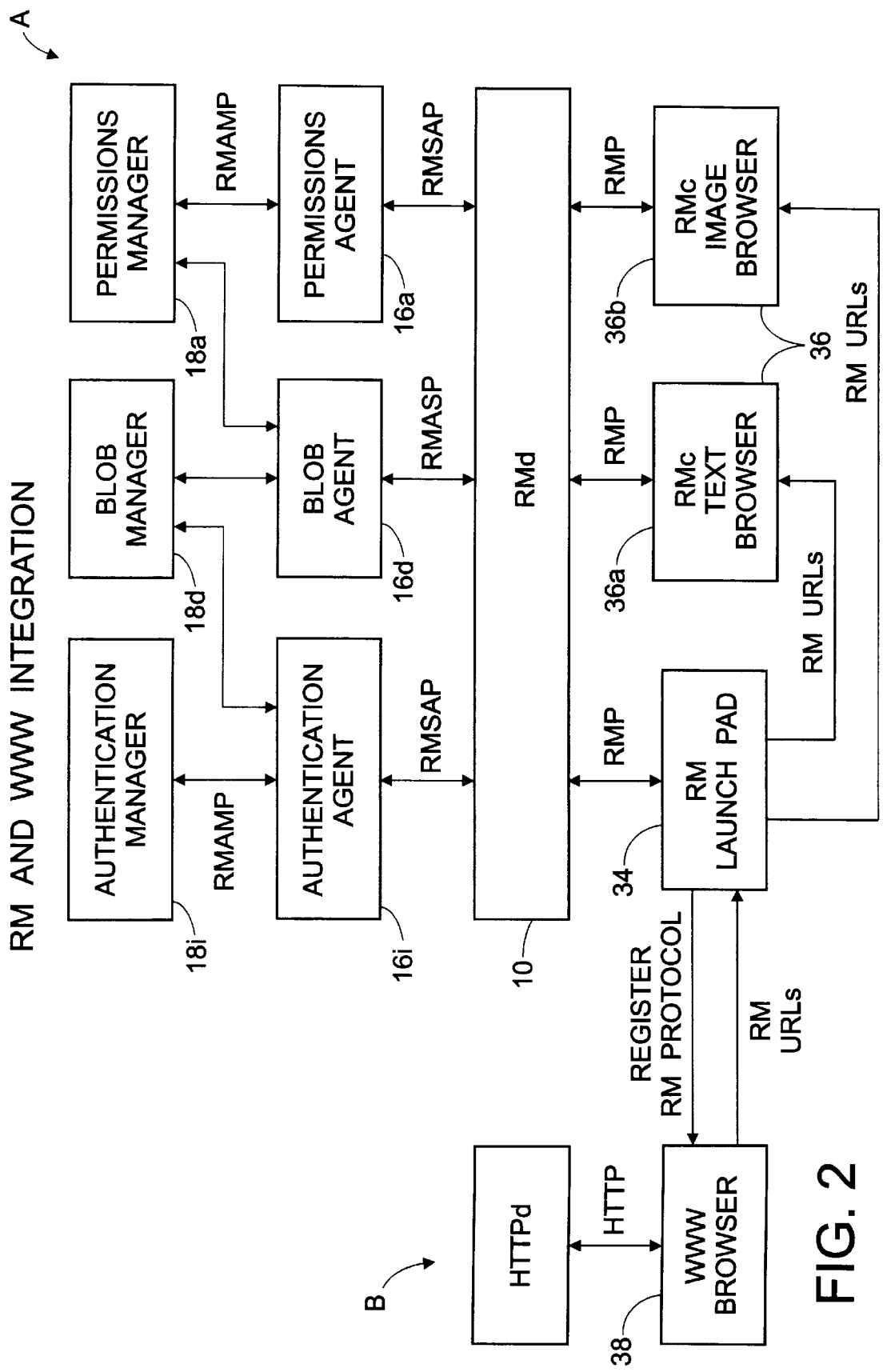
FIG. 2 illustrates integration between the RM system and an internet environment.

FIG. 2 illustrates integration of RM system A and the internet environment B. Particularly, it shows that WWW browser 38 exchanges protocols with RM launch pad 34. This figure further illustrates that RMc browsers 36 may be text browsers 36a, image browsers 36b, as well as others. Further depicted by FIG. 2 is that authentication agent 16i and BLOB manager 18d share a communication path, and BLOB agent 16d and permissions manager 18a also share a communication path.

RM system A implemented according to the above architecture protects intellectual property at workstation 20, allowing only permitted use of digitized intellectual property, and also tracks all billable and non-billable uses of the intellectual property.

RM server 10 is configured to have a secure communications channel with RMc trusted browsers 36 located on workstation 20, which are downloaded to workstation 20 from RM server 10. RMc browsers 36 are configured to require immediate execution of authentication data embedded within the RMc browsers themselves or they will immediately expire. Once RM server 10 authenticates the combination of user and RMc browsers 36, intellectual property is capable of being sent to workstation 20. Further, RMc browsers 34, are constructed so that authentication information of an individual RMc browser expires within a predetermined time period, specified by RM server 10, after which time RMc browsers 36 are rendered useless.

2a. Launch Pad

Operation of RM system A will be described with specific attention to FIGS. 1b and 2. In the following explanation, workstation 20, is running a current version of an internet browser such as Netscape Navigator, Mosaic, etc. Launch pad 34 must be started before any requests from an unsecure system can be serviced, and must remain running throughout a user session. If the unsecured system can request both unsecure media and RM controlled media, the present invention must determine which media requests are RM controlled and directs those to launch pad 34. Installation of launch pad 34 needs to occur only on a single occasion and may be accomplished either by downloading of launch pad 34 from a disk or remotely. Launch pad application 34 may be considered a plug-in type program to existing internet browsers.

It is known that WWW browsers implement a messaging interface developed by SpyGlass, Inc. called the SpyGlass Software Development Interface. Launch pad 34 registers a RM URL schema with the WWW browser at launch pad startup. This registration process ensures that every subsequent request for a RM URL will cause the WWW browser to send an "OpenURL" message to launch pad 34 with the URL as a parameter. After the "OpenURL" is sent, the WWW browser performs no further action for that request.

If as in the above example, registration with an unsecure (non-RMc) browser is required, it is performed at launch pad startup. If the registration fails, launch pad 34 displays an appropriate message and then terminates.

As a user is browsing materials on a Web server, normal HTTP HTML transactions are taking place until the user comes across a pointer to an RM controlled object (i.e. intellectual property). At this point, the user is no longer looking at a standard URL, rather, they are now viewing an RM URL which begins with RM:// rather than the standard HTTP://. When this situation occurs, launch pad 34 acknowledges that it has the capability of handling URL's that begin with the RM designation, thereby moving the user into the RM system A. RM system A operates using an RM protocol which defines the syntax of client requests and server responses over a network connection. The protocol specifies a set of services which the server provides, such as authentication, binary large object (BLOB), and permissions. Each service specifies a set of commands which are valid for that service. Parameters are specified for each command in a given service.

Requests are classified as secure or unsecure depending on the nature of the command. Unsecure requests do not involve authentication of intellectual property (i.e. BLOBs). Unsecure requests may be sent in a clear open network. Secure requests require an encrypted private channel to avoid eavesdropping on authentication transactions and the theft of the intellectual property.

As previously noted, when an RM URL is encountered, a WWW browser 38, turns over control of the request to launch pad 34. Launch pad 34 then contacts RM server 10 and requests the type of object (i.e. digital media data) which has requested from workstation 20. Depending on the configuration of the RM URL encountered, RM server 10 will reply that the desired information is image, text, an Acrobate file (Acrobate is a trademark of Adobe Corporation), etc. Thus, launch pad 34 is a background process that receives request for digital media originating from unsecure environments. Launch pad 34 queries RM server 10 to determine the type of media and dispatches the request to the appropriate RMc browser located within RM server 10. RMc browser 36 then downloads the media and provides controlled usage services.

Figure 3:
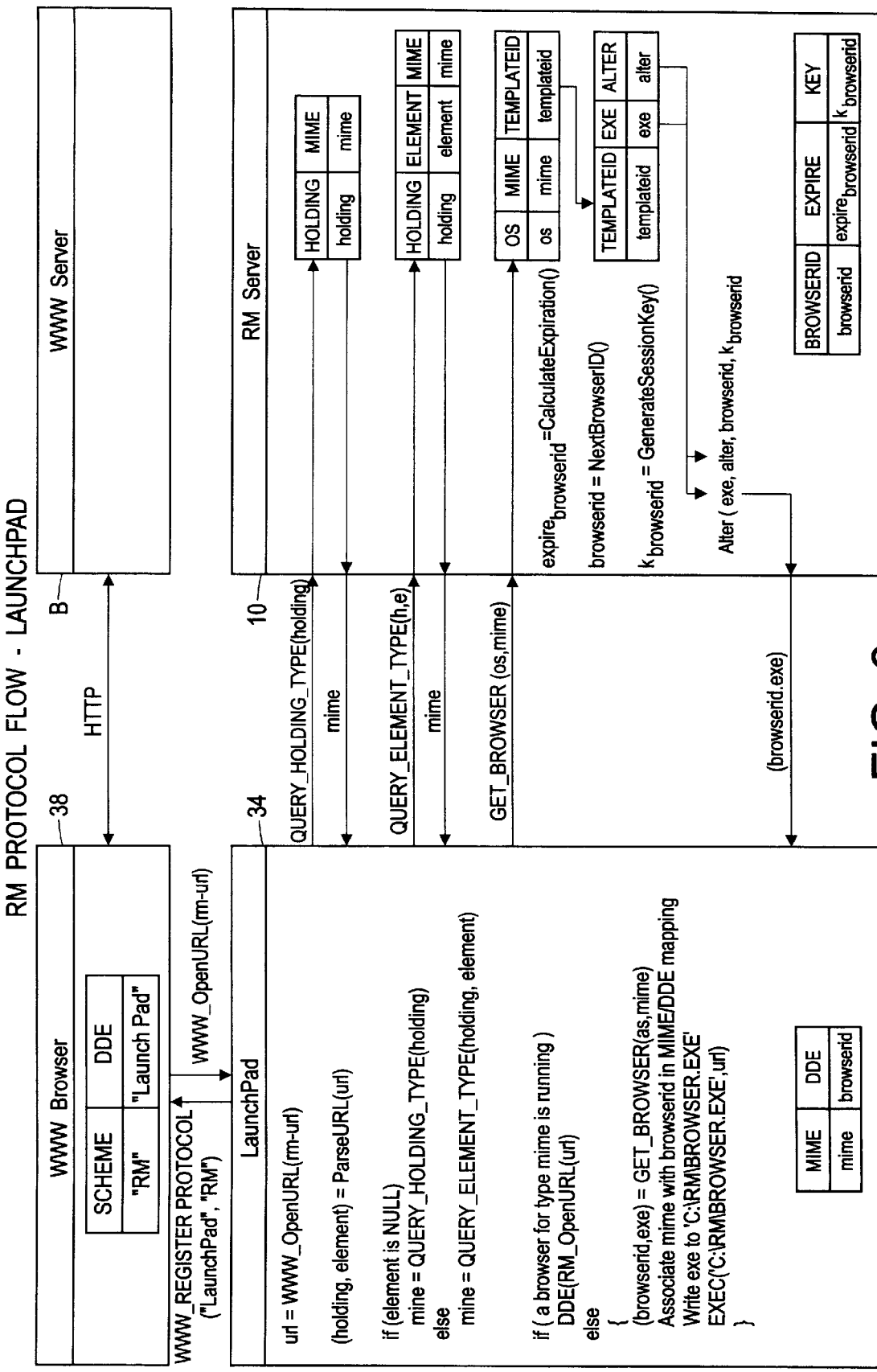
FIG. 3 sets out an example of RM protocol flow for the launch pad of the present invention.

It is to be noted, as illustrated in FIG. 3, communication between launch pad 34 and RM server 10 is based on a proprietary protocol which is the Rights Management Protocol (RMP) as opposed to Hyper-Text-Transfer-Protocol (HTTP) used for the World Wide Web (WWW).

The first part of the RMP conversation between launch pad 34 and RM server 10 is not considered a highly secure transfer as it is simply an inquiry about the type of object being requested so that an appropriate browser type may be used. Once launch pad 34 has inquired from RM server 10, the type of object, launch pad 34 sends another RMP transaction to request a browser of that type. Particularly, if it is an image which is being requested then the request will be for a RMc image browser 36b.

2b. Browser Acquisition

Upon receiving the request RM server 10, which holds a list of all browser types of which it is aware, will retrieve the particular browser from BLOB manager 18d which has all the actual browser executable programs stored inside RM server 10.

At this point, authentication agent 16i receives the particular browser and inscribes authentication and security information into browser executables files, which in the present embodiment would be Windows executable files Java Applets or Macintosh (Windows Java and Macintosh are trademarks of Microsoft Corporation Sun Microsystems and Apple Computer, respectively). Once this operation has been completed, the requested browser 36 is downloaded to launch pad 34, if the requested browser is not presently running.

With more specific attention to FIG. 3, the previously described operations include the following steps:

i. Determine URL Type

Launch pad 34 must determine from RM Server 10 the type of media that corresponds to the request. These types are stored as mime (multi-purpose internet mail extension) types. It first invokes rmParseURL to extract the HOLDING ID and the ELEMENT ID. If the ELEMENT ID equals 0, launch pad 34 calls rmQueryHoldingType to determine the mime type. If the ELEMENT ID exists, launch pad 34 uses rmQueryElementType.

ii. Check the Browser Table

Launch pad 34 maintains a table that identifies the currently running RMc browsers and their mime types. After the type of media is determined, launch pad 34 checks this table to see if there is an entry for the requested type.

Depending on the results of the Browser Table lookup, the next action is one of the following:

iii(a). Download the RMc Browser

If there is no entry in the browser table, launch pad 34 issues rmLaunchBrowser (or GET_BROWSER) to retrieve a new RMc browser, save it to disk, and start it. The HOLDING ID and the ELEMENT ID are passed as parameters to this function. If rmLaunchBrowser (or GET_BROWSER) returns a success code, launch pad 34 adds a new entry to the table consisting of the browser's identification and mime type.

iii(b). Send a Request to a Running RMc Browser

If an entry for the requested type is found in the table, launch pad 34 sends an openElement message to the browser identified by that entry. The openElement message includes the HOLDING ID and ELEMENT ID as parameters. If the response to this message indicates that the requested RMc browser is not running, launch pad 34 removes the entry for that browser from the table, and downloads a new copy of the required browser, as described in 2.i, above.

A template for the conversation between launch pad 34 and RM server 10 of FIG. 3 is set forth in FIG. 4. Launch pad 34 stores the executable browser 36 on a disk (configured in one embodiment in a standard windows.exe file).

2c. Browser Authentication

Next, launch pad 34 starts execution of RMc browser 36, i.e. such as RMc image browser 36b running on workstation 20.

To ensure security, RMc browser 36, which is received in accordance with this operation, includes the security provisions of, i) requiring immediate authentication upon startup, ii) will only stay active for a predetermined amount of time, and iii) when closed is removed from workstation 20. RMc browser 36 must authenticate itself and its user to RM server 10 to protect intellectual property from theft. The noted security provisions are provided when the intellectual property being supplied are public domain documents or copyrighted material.

Thus, when RMc browsers 36, such as image browser 36b, first begins running on workstation 20, it must immediately issue an rmAuthenticateBrowser command to RM server 10. The, rmAuthenticateBrowser command must be executed within a fixed window of time, i.e. such as 30 or 60 seconds from the time browser 36 has started running. If the authentication command is not issued and received, RM server 10 will ignore that particular browser essentially creating an instantly expired browser after the 30 or 60 seconds are expired.

Once one of the RMc browsers 36 is no longer required, RMcloseBrowser command will be issued and that browser 36 is removed. An additional feature of RMc browsers 36 is that they are configured to exist only for a predetermined time period after which it automatically expires. When a RMc browser is closed, the element cache is cleared and the state of RM server 10 is updated. A "close" message is also sent to launch pad 34 for updating of its internal tables.

2d. RMc Browser Operation

Figure 5:
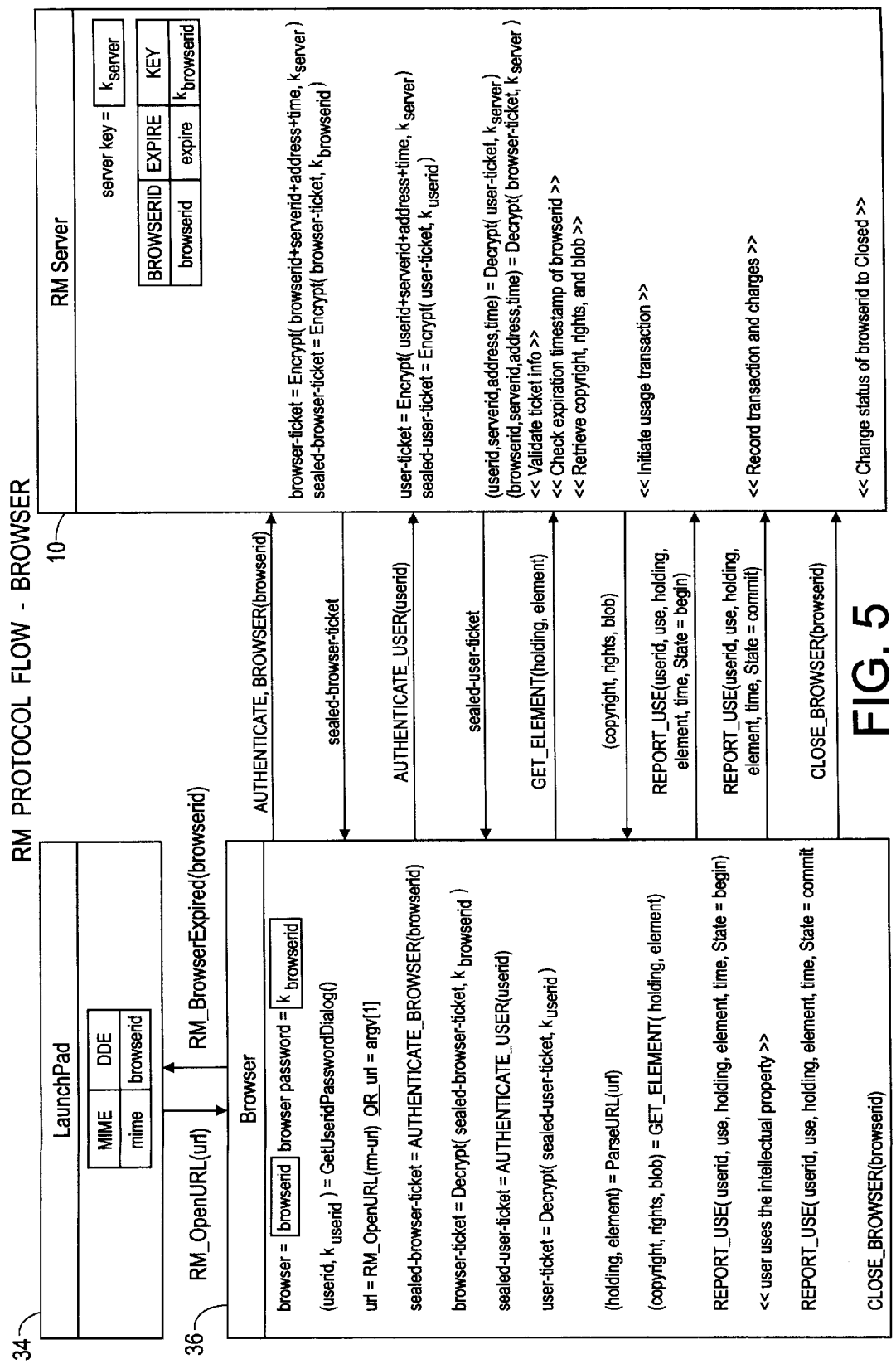
FIG. 5 illustrates the RM protocol flow of an RMc browser.

FIG. 5 illustrates the above described actions in greater detail, particularly all RMc browsers 36 perform the following sequence of operations at startup:

i. Startup Parameters

RMc browsers 36 must accept two startup parameters, which are the Holding ID and Element ID which identify the first RM element to retrieve when the application starts execution.

ii. Browser Authentication

When RMc browser 36 is started, it must first call rmInitialize to set variables and communication parameters (not shown in FIG. 5 but see FIG. 6). The next action to occur is browser authentication. Each browser instance is inscribed with a private id and password. The browser issues rmAuthenticateBrowser to request authentication from RM server 10. If the authentication succeeds, execution continues. If the authentication fails, the browser displays a message, then promptly terminates.

iii. Download Element-Static

After browser authentication is successfully completed, the RMc application opens a main window and begins downloading the element specified by the startup parameters. At this point, a rmUserTicket variable contains a ticket representing a public (anonymous) user. The browser issues rmGetElement to retrieve the element's usage rules, copyright notices and content.

Browsers will display a download status indicator for rmGetElement. If the response to this call indicates that the public user has no permissions, the browser performs user authentication, then retries rmGetElement. Since rmGetElement blocks until completion, browsers have no means of determining the amount of data that has been transferred until the call completes.

iv. Download Element-Progressive

An alternative means of downloading an element allows the browser to track the amount of data transferred. The browser issues rMBeginGetProgressive to initiate a download. The browser determines a desired buffer size and repeatedly calls rmNextGetProgressive to download one buffer per call. The browser will update a download progress indicator between calls. When all the data has been transferred, the browser will receive a return code so indicating. During a download, if a user requests that the download be stopped, the browser must call rmAbortGetProgressive.

V. User Authentication

If necessary, user authentication is performed by issuing rmLogonUser. This function opens a login dialog to obtain a user id and password, then requests authentication from the server. If user authentication succeeds, the function resets the rmUserTicket variable. If authentication fails, the browser displays a message and allows the user to retry rmLogonUser or cancel. If the user cancels, rmUserTicket remains unchanged. The third unsuccessful user authentication attempt results in the user's ID being suspended. The ID must then be reactivated by the system administrator.

vi. Display Copyright Notices

When the download is complete, the copyright notices for the element are prominently displayed. A detailed copyright notice appears in a dialog immediately after download completes. rmLongCopyrightDialog is used to display the detailed copyright notice. A short, one line copyright notice must be continually displayed in a status window on the screen while the element is brought into focus.

vii. Startup Element Use

Most RMc browsers allow a startup use for an element. This is an element that is invoked immediately after download and reported to the server, without user intervention. For example, a RMc browser may display a plain text element in its main window or play an audio clip immediately after it is loaded. The first rule returned in the collection of rules is the startup rule for the element. The startup use is reported and serviced by invoking the RM event handler that corresponds to the first rule. RMc browsers that allow startup use allow the user to set startup uses off.

A template for the conversation between RMc browser 36 and RM server 10 of FIG. 5 is set forth in FIGS. 6a–6b.

2e. Launch Pad Responses

Launch pad 34 has been further configured with specific responses to various non-zero response codes which return from RMLIB functions, including:

rmQueryHoldingType and rmQueryElementType:

If these functions return a non-zero response code, the launch pad displays a message and terminates the request.

rmLaunchBrowser (or GET-BROWSER):

If this function returns a non-zero response code, the launch pad displays a message and terminates the request.

Miscellaneous launch pad implementation requirements include:

i. requirements of the unsecure environment: There is no method of retrieving or using Rm controlled digital media other than routing requests to the launch pad which forwards them to RMc browsers. This holds true whether or not the launch pad is running. Unsecure environments can not directly load or display RM controlled media under any circumstances.

ii. RMc browser to launch pad close message: The launch pad handles a close message which is sent from an RMc browser before it closes. The event handler for this message removes the corresponding entry from the browser table.

2f. Encryption/Security

The architecture of the present invention includes features for specifying an encryption level to be used for both public and private content. Particularly, it is possible to set levels of encryption of data downloaded to an RMc browser which then needs to be decoded within the browser. This may be done for public as well as private use.

Another security measure in the present invention is that even for public users, verification of a user's IP address location is made. Thus, tests are undertaken to determine whether or not the user is public and also whether the user is at a public place where the materials can be delivered. Even if the requested intellectual property are public domain materials that all users may have the right to access, the location where those materials may be accessed can be restricted by blocking certain IP addresses as to the delivery of the materials.

In accordance with the presently preferred embodiment, all locations are generally denied access unless they are explicitly granted. Thus, the system selectively enables access sites.

2g. rm Event Processing

User actions in a browser that trigger controlled usage functions on RM elements are called RM Events.

i. Event Processing Loop

After an element is loaded, and a startup use is invoked, the application enters an event processing loop. The RMc browser must implement event handlers for every controlled use of an element. These event handlers map user interface events (button clicks and menu selections) to functions which report the action and perform the service. The RMc browser provides no alternative events and handlers that circumvent the usage rules specified for the element (i.e. If printing is an option, there is only one event handler for printing, which is the RMc print event handler.)

If any controlled uses are forbidden for a particular user and element, the appropriate user interface widgets are disabled while those rules apply. The GUI widgets' states are set for every rmGetElement or when a loaded element is brought into focus. RMc browsers implement a setGUIWidgets function which issues rmcheckPermission for each use type that enables or disables the GUI widgets appropriately.

ii. RM Event Handlers

The RM event handlers perform specific controlled usage requests. Each RM event handler implements the following sequence of operations.

Check Permissions: The browser issues rmcheckpermission to determine if the user has permission to perform the requested service. If permission is denied, the browser displays a message and immediately exits the event handler. This check is needed in case the GUI widgets are not properly disabled, or an attacker is trying to force GUI widget messages into the RMc browser.

Begin Transaction: The RMc browser then begins the usage transaction. rmReportUse is invoked sending RM_TRANSACTION_BEGIN as the transaction state flag. rmReportUse checks the charge approval settings and requests charge approval from the user if necessary. If the response indicates that the user declined the operation because of the charge, the browser sends rmReportUse using RM_TRANSACTION_DECLINE as the state flag, then immediately exits the event handler Perform Request: After receiving a successful return code from the begin transaction process, the application performs the requested service. If the application performs the service successfully, rmReportUse with the RM_TRANSACTION_COMMIT flag is invoked. If a software or hardware problem prevents the proper performance of the service, the browser issues rmReportUse with the RM_TRANSACTION_ABORT flag. It is important for the event handler to correctly determine the success or failure of requests in as many situations as possible.

In the event that an element is displayed while being downloaded, a commit is issued after the last chunk is read and displayed. Abort is issued if the user stops a progressive download by calling rmAbortGetProgressive.

RMLIB provides cache management functions: rmElementOpen, rmElementLength, rmElementRead, and rmElementClose. These functions provide I/O streaming services to access data from the element cache. They are used by RM event handlers to assist in performing usage requests.

2h. Exception Handling

This section describes how an RMc browser handles various non-zero response codes which can return from RMLIB function calls.

i. All Secure-Mode RMLIB commands:

All RMLIB functions that send commands to the RM server in secure mode require a valid user ticket and a valid RMc browser ticket.

Expired browser tickets result in a server response code of RM_ERROR_BROWSER_EXPIRED.

RMc browser tickets which are invalid for any reason other than expiration result in a server response code of RM_ERROR_INVALID_BROWSER_TICKET.

Invalid user tickets result in a server response code of RM_ERROR_INVALID_USER_TICKET.

If either of the above invalid browser ticket codes are received, the RMc browser displays a message and immediately terminates.

ii. rmGetElement

If the rmGetElement function receives an RM_ERROR_PERMISSION_DENIED response code, the browser must perform the user authentication procedures then retry the function.

iii. rmAuthenticBrowser

If this function fails for any reason, the RMc browser should display a message and immediately terminate. This can occur when a user attempts to start an expired browser.

iv. rmLogonUser

If this function fails, the browser should allow the user to sign on again or cancel. If the user cancels, the user ticket remains unchanged.

V. rmReportUse with RM_TRANSACTION_BEGIN State

If this function returns RM_ERROR_CHARGE_DECLINED, the RMc browser must issue rmReportUse with the transaction state set to RM_TRANSACTION_DECLINE and exit the event handler without performing the service. If any other non-zero code is received, the RMc browser must simple exit the event handler without performing the service.

2i. Miscellaneous Implementation Requirements

This section contains miscellaneous RMc browser requirements.

i. Standard, Features

RMLIB contains several standard features that must be implemented in every RMc browser. The RMc browser must implement GUI widgets to trigger each of these functions. A list follows:

rmchagepassword: Opens a dialog to allow the user to enter a new password and store the new password in the RM Server.

rmchargeApprovalSettingsDialog: Opens a dialog that allows the user to set the charge approval modes and thresholds. A RMc browser may be set to request approval for the following situations; never, for every chargeable operation, when cumulative charges exceed X, and when an individual charge exceeds Y.

rmDisplayPermissionDialog: Displays a dialog showing all usage rights and the associated charges for the loaded elements.

rmchargesDialog: Opens a dialog to allow the user to find out what the total charges are for this RM session.

rmQueryExpirationTime: Allows the user to find out the time remaining until the current RMc browser expires.

ii. Host Operating System Feature Usage

RMc browsers implemented on specific OS platforms may take advantage of any features offered by that platform, provided these features do no compromise the protection of the intellectual property. There are no specific look-and-feel requirements from an RMc browser. However, there must be clearly-identified user interface elements for every RM controlled event described in the above sections. The resources in RMLIB will have a consistent look and feel across all OS platforms.

iii. Single Executable Module

RMc browsers should be compiled as a single executable file. There should be no installation requirements for an RMc browser beyond downloading the executable and launching it. Usage of DLLs, separate runtime images, and initialization files are discouraged.

iv. Changing the Element Focus

Most RMc applications allow users to browse multiple elements. The loaded elements are kept in an array called rmElement[ ], defined in RMLIB. RMc browsers must maintain a focus variable that is set whenever a loaded element receives the application's focus. This focus variable is used as the rmElement[ ] array index for usage reporting and permission checking. RMc browsers must use this variable to ensure that usage functions are reported for the correct elements.

V. Disposing of an Individual Element

For various reasons, a user may wish to dispose of a single element (i.e. memory or disk space conservation) without closing the browser. RMc browsers should allow a user to dispose of an individual element. rmElementDestroy must be issued to clear the cache space occupied by the element.

vi. Abnormal Termination

If launch pad 34 detects that a RMc browser 36 has aborted due to a memory protection fault or other unexpected problem, it must clear any cached storage that belonged to that browser.

3. Discussion/Example

Returning attention to RMc browsers 36, it is noted that such browsers are software applications designed to provide controlled usage services for the digital media. Types of digital media include, but are not limited to, plain text, encoded text (i.e. SGML HTML, XML), still images, audio, motion video and animated models. Any of these simple types of browsers may be combined to form compound types. The RMc browser applications cooperate with RM server 10 to request the holdings and elements which form the digital media and provide usage control.

While, the present system must control initial access to the intellectual property, it must also prevent unauthorized uses of this digital media throughout the time it is resident on workstation 20. This dynamic control is driven by a set of permissions rules that are returned from the RM server 10 for each element request. Use types to be controlled include, but are not limited to, display (for still media), play (for time sequence media), local print, remote print, excerpt, and download.

The intellectual property existing in RM system A are provided to a user based on the rights of the user registered with the RM system. Particularly, previous to a request from a user, an administrator has encoded the terms of a license within the permissions management logs or database 28. At the time a user makes a request, their identification information, location information and other characteristics of their use are evaluated within the permissions manager 18a, based on that information and the license agreement information which was previously stored in the databases. Therefore, the permissions provided to a user are variable, depending on who the user is and the location from which the request was made.

Figure 7:
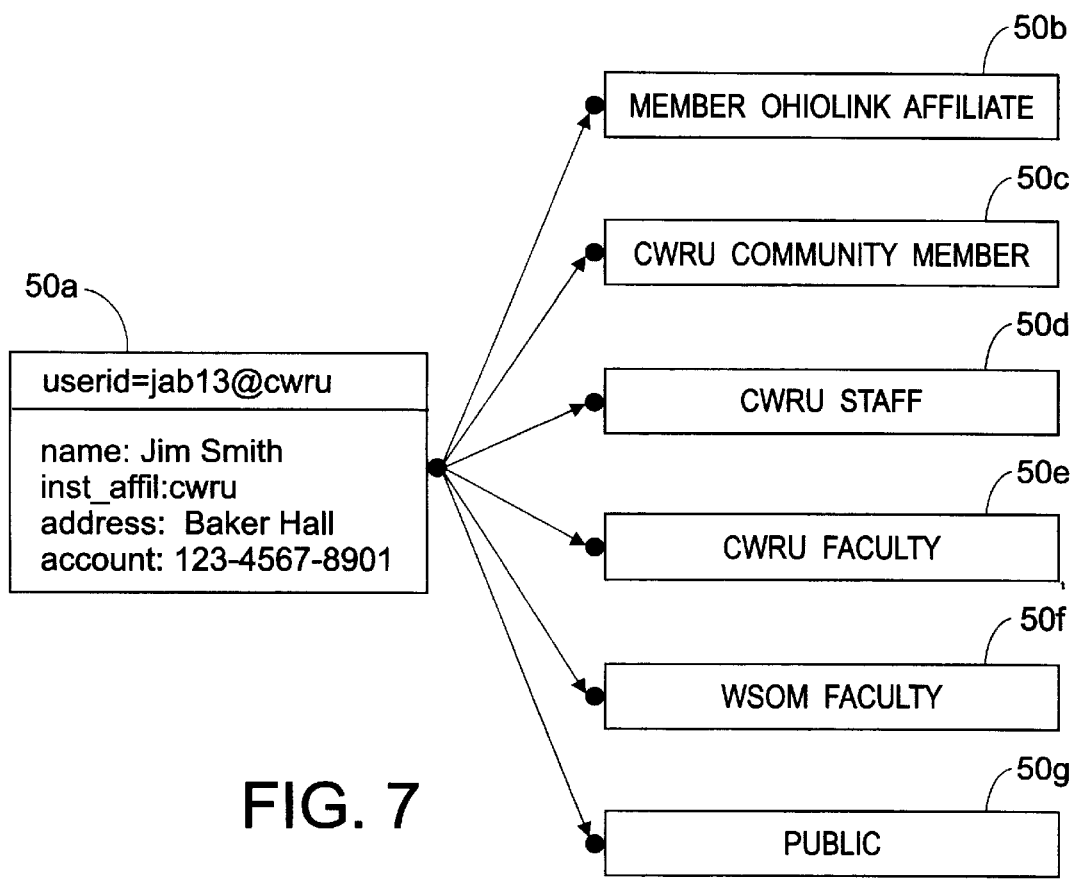
FIG. 7 illustrates one form of user profiling implemented in the present invention.

The above limitations are incorporated into RM system 10 through the use of user profiling as shown in FIG. 7. User profiling maps a specific, and in most cases unique, user ID into one or more user categories. This feature allows usage permissions rules to apply to whole classes of users and allows RM system A to collect usage statistics without unduly compromising user privacy rights. Thus, the user "Jim Smith" 50a in FIG. 7 is a member of user categories 50b–50g.

Figure 8:
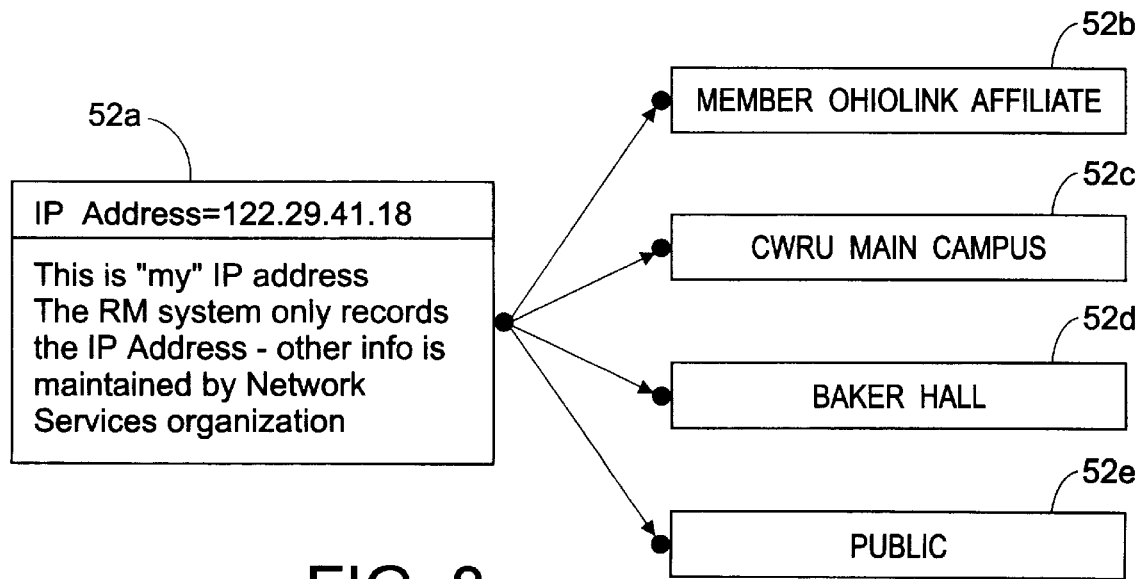
FIG. 8 illustrates one embodiment of IP address profiling as incorporated in the present invention.

RM system A also incorporates IP address profiling as illustrated in FIG. 8. IP address profiling is used to map a specific IP address to one or more location categories. This feature allows usage permission rules to apply to whole classes of IP network addresses and allows system A to collect usage statistics without unduly comprising user privacy rights. Thus, the IP address "122.29.41.18." 52a is a member of groups 52b–52e.

Figure 9:
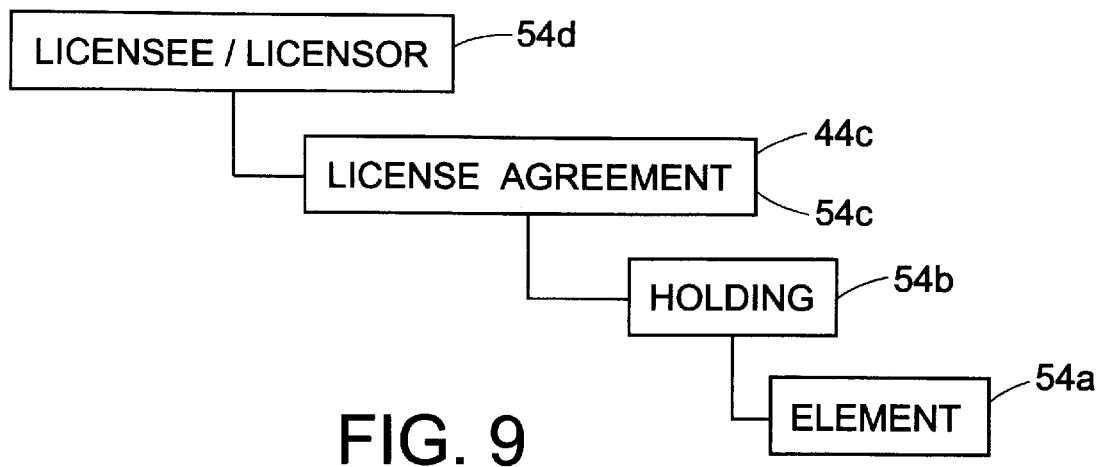
FIG. 9 depicts varying levels of permission rules.

As previously discussed, access and usage rights to the content of the digital libraries managed by RM system A must be explicitly conveyed by the rights owners. As illustrated in FIG. 9, permissions rules may be specified at any one of four different levels, element rules 54a, holding rules 54b, license agreement rules 54c and licensee/licensor rules 54d.

Element rules 54a are specific to the text, image, video, audio, etc. object which is to be delivered to a user workstation 20. Holding rules 54b apply in general to all elements within the holding but may be overridden by element rules 54a. License agreement rules apply, in general, to all materials provided under a license agreement but may be overridden by the element rules 54a and/or holding rules 54b. The licensee/licensor rules 54d apply, in general to all materials in the digital library but may be overridden by license agreement 54c, element rules 54a and/or holding rules 54b.

Turning to FIGS. 10–13, an example of the operation of RM system A is described. Assume an Ohio Link affiliate (Ohio Link being an association of online data provides organizations), for example, Case Western Reserve University (CWRU) wants to make a set of digitized 35 mm art history slides 56 available for limited statewide distribution. Using RM system A, Ohio Link and CWRU enter into a distribution agreement. Ohio Link is capable of defining certain access policies as a set of licensee rules. Terms under which Ohio Link and CWRU agree to make the content available are encoded as a set of license agreement rules.

Figure 10:
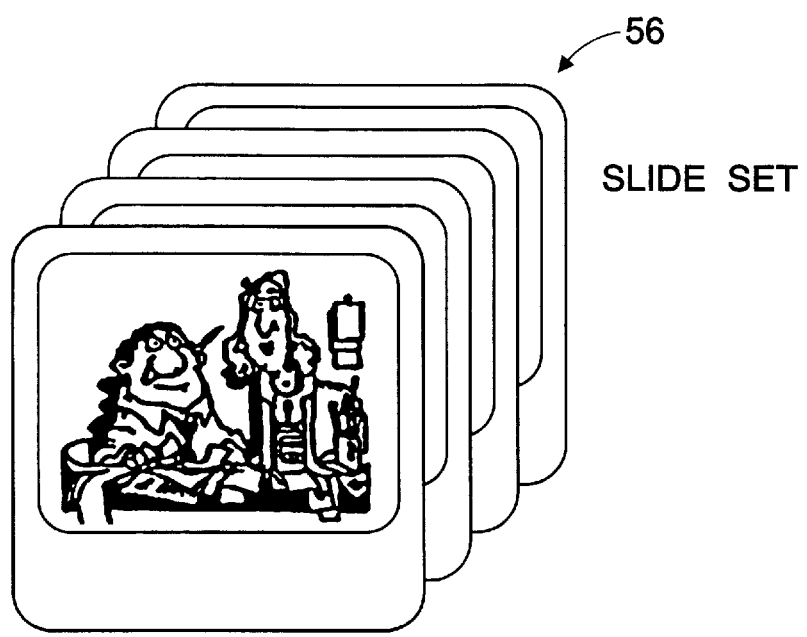
FIG. 10 is an illustration of a set of slides used in an example of operation of the present invention.
Figure 12:
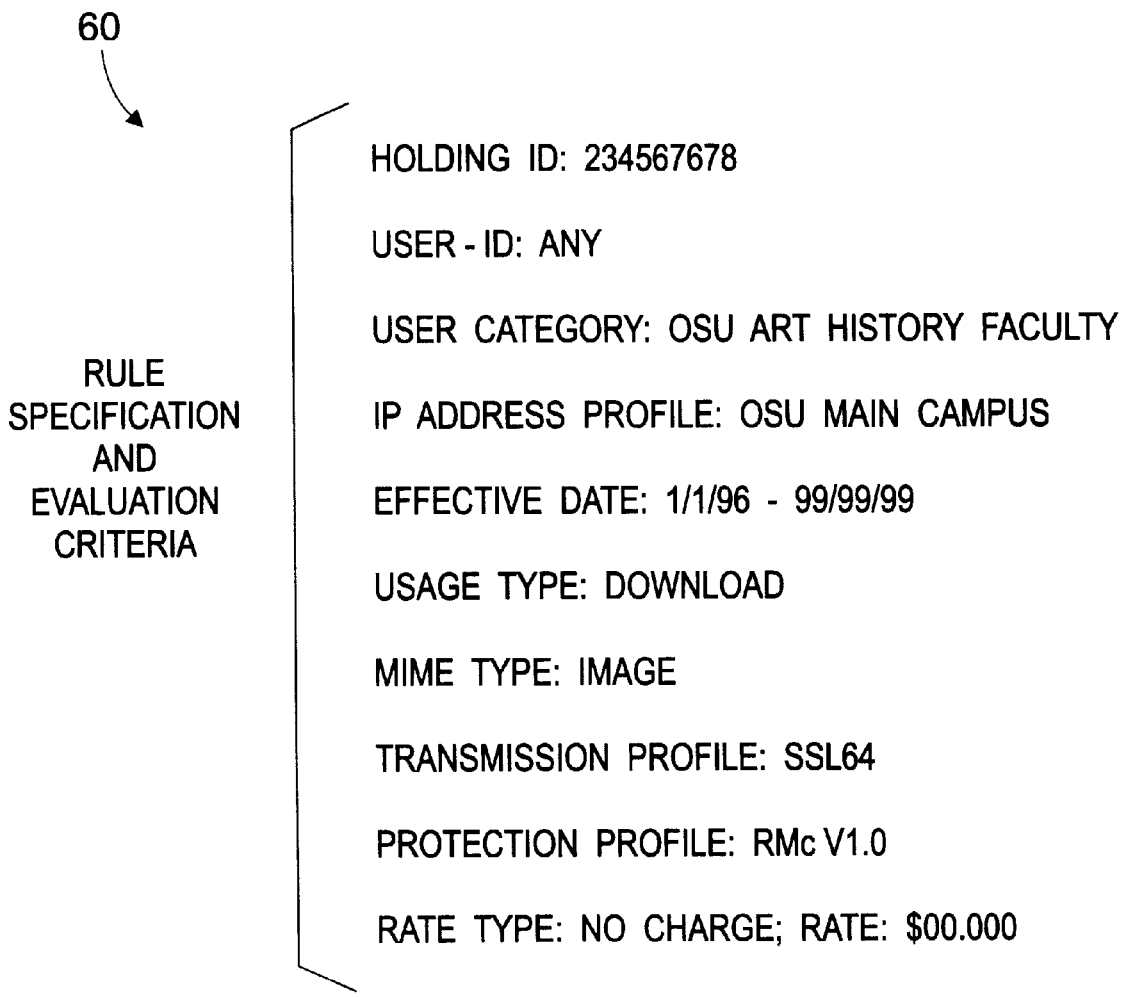
FIG. 12 is a second illustration of a holding rule example according to the teachings of the present invention.

In this example, the slide set of FIG. 10 is defined in FIG. 11 as a holding (for example, No. 234567678) 58. Permissions specific to this holding are encoded as the holding rules. The individual slide images are defined to be elements of holding No. 234567678 (e.g. element No. 36709217). Permission rules specific to an element are encoded as element rules. Once the licensee rules, license agreement rules, holding rules and element rules have been determined and incorporated into the holding, the intellectual property (i.e. the 35 mm art history slides) are available based upon the defined rules. Such a distillation of the license agreement shown in FIG. 11 is a first holding rule example. For images in holding No. 234567678, any art history faculty member at any Ohio Link affiliate institution IP address may download images at a charge of $1.50 each during the calender year 1996, provided the request is received from a member system that supports SSL 64 bit transmission and uses a RMc compliant browser. The second example of a holding rule example is shown in FIG. 12. This second holding rule 60 (holding No. 234567678) allows, any CWRU art history faculty member at the CWRU main campus IP address to download an image at no charge in perpetuity, provided the request is received from a member system that supports SSL 64 bit transmission and uses a RMc browser.

Figure 13:
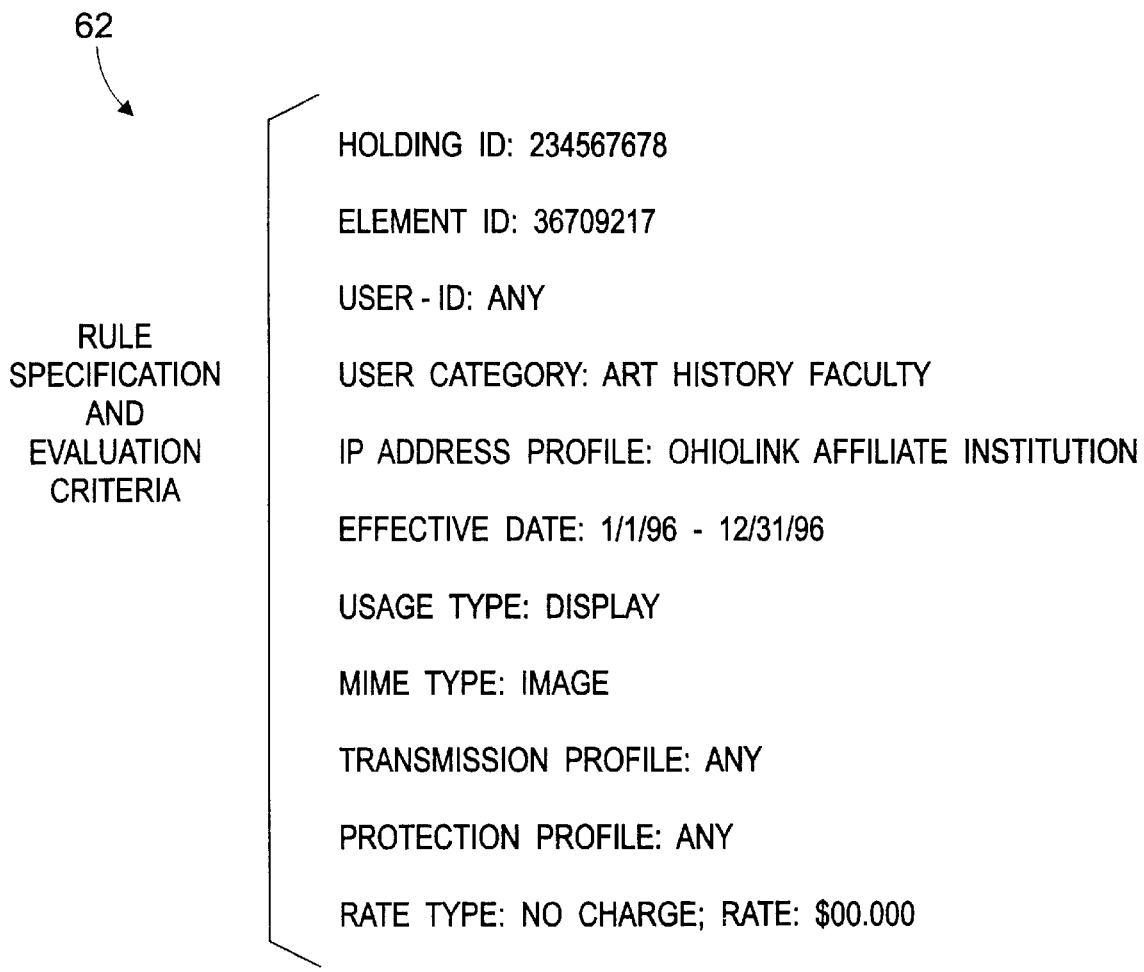
FIG. 13 is an element rule example according to the teachings of the present invention; and, FIG. 14 depicts the concepts of the present invention implemented in an environment with an existing Kerberos validation configuration; and, FIG. 15 illustrates a pictorial of the secure environment provided for intellectual property management according to the teachings of the present invention.

FIG. 13 illustrates an element rule example 62. In this figure, for element No. 36709217 (i.e. 1 slide of the set of slides) in holding No. 234567678 any art history faculty member at any Ohio Link affiliate institution IP address may display the image without charge during 1996, regardless of the transmission methods and protection capabilities of the RMc browser used.

From the above example, it would be noted that within permissions manager 18*a*, users have group memberships so it is not necessary that a specific individual user has certain permissions in the system, but rather the user as a member of a given group may have permissions inherited from membership in the group. This concept was developed to ease the burden on administrators so that RM system A could designate certain groups rather than deal with all individual members of a group. This concept is analogous to other security systems either for main frame, Unix, or Window applications, as it increases the ease of management by providing group level permissions.

Returning to FIG. 1*b*, local server repository 22 is going to have a maximum storage capability to hold intellectual property, and periodically requests may be made for things which are not located on the repository 22. In this situation, the external service provider 24 allows for the possibility of obtaining this information from a formal distribution system and publishing system. Another use for the external service provider 24 is when a publisher includes information on a server and that server can be electronically accessed by RM system A. For example, a magazine or newspaper may have a web server including the content of the publications. In this instance, BLOB manager 18*d* is configured to access the web site to obtain a particular object such as a holding element. Therefore, BLOB manager 18*d* is configured to provide support for multiple repository and repository types in implementation, BLOB manager 18*d* is configured with the appropriate protocols and transmission capabilities to access multiple repositories. The BLOB manager is configured to understand how to communicate with the repositories and all of the rules and all the location information will identity the storage location of the repository ID, and by resolving a repository ID at the BLOB manager, the proper protocol can be invoked or the proper code exchange information set to allow for access to multiple repositories.

As previously discussed, RMc browsers are trusted clients which not only deal with permissions but enforce the functionality that is available to a user. Particularly, RMc browsers will "gray out" in a Windows environment things such as a capability to print, download, etc. if a user does not have those sort of rights or permissions. Therefore, use of RMc browsers are an active engagement.

The RMc browsers also provide for a usage history of the intellectual property. Anytime a use is made of intellectual property in the RM system, whether it is to print, retrieve, or view, a transaction is initiated by a helper application and recorded at RM server 10 through permissions manager 18*a*. In this manner, a log is kept of all uses and the usage log can then be provided to a content provider for marketing information or to better tailor the electronic products for distribution. Thus, there are two intended uses for the usage log, one is for billing and the other is for obtaining demographic information. The present RM system A also allows a publisher or intellectual property rights owner to specify the type of processing that is to be allowed for outbound information. For example, through the license agreements, it is possible to specify that a particular type of processing of the information is possible. These processing profiles are set up on an outbound side such that a delivered document may include a visible watermark, invisible fingerprint, transaction ID or some other identifying information. The present system also includes a protection profile which can be specified by content type or an individual piece of content. The protection profile specifies how the security exchange is to be performed so that an intellectual property rights owner can ensure what degree or level the property is to be protected.

In this instance, such a protection profile could include the type of launch pad 36 or viewer which must be used for a particular type of material. In this way, only the most current viewer or a specific viewer might be designated for a particular type of object. By use of the processing profile and the protection profile, a user can deliver data as tightly or as loosely within a set of parameters as desired. In the present RM system A, RM server 10 not only provides the basic rights management services described, but also allows the system to function to protect properties when the protection is needed to extend that protection against a wide variety of repositories but at the same time to operate in the background and be non-invoked when its services are not necessary. Particularly, the services of the present invention are only invoked when they are necessary.

In the present invention there are unique aspects when the system is viewed from an individual user's perspective. Particularly, the present system provides for a multiple licensing strategy where there are possibilities of multiple license agreements covering the same set of materials and also a situation where users are set within multiple groups. The present system evaluates what rights a particular user will have based on what is the most beneficial rights and permissions possible for that individual user.

Particularly, when a user requests authentication, they enter their credentials or IDs and then a browser submits authenticate user commands which will obtain a security token which the user passes with all future commands. Therefore, the next time a user issues a rmGetElement command the security token provided will determine the accessibility of the element requested.

What occurs is the system will have a scope in evaluating the permission rules. In evaluating permissions rules, there is of course a scope of permissions rules in existence with the smallest scope being the element rules or element permissions, thereafter the holding permissions, the license agreement permissions, and the license/licensor permissions as discussed in connection with FIG. 9. It is noted the present invention may also be configured with overall system permissions. The described permissions exist for a user as an individual and also exist for every group the user is a member. RM system A is configured to do an ordering in which a search is performed on permissions from an element up to a system level first and through the user IDs and then through all groups of which the user may be a member. Essentially, the system is looking for the largest amount of permissions available to a user, i.e. either as an individual or as a member of a group and the most permissive access capabilities for that user. As previously discussed in connection with FIGS. 11–13, if a user as an individual may nevertheless be restricted from printing a certain element they may have that right by virtue of being in a particular group. Under the present architecture if a user is a member of a group which allows the printing the user can be provided with the broadest right. It is to be appreciated, that an opposite ordering can be implemented, i.e. the narrowest permissions are provided to the user.

A further feature of the present invention is the capability of authenticating a user both on an individual level and as a member of a user or administrative group or groups within the RM system.

Particularly, many authentication technologies exist. One type of system is known as Kerberos, which provides a user ID password validation for everyone within a certain group such as in a corporation or college campus. Kerberos was jointly developed by Digital Equipment Corporation, International Business Machines Corporation (IBM), and the Massachusetts Institute of Technology (MIT) for use on an MIT campus-wide computer network.

Kerberos uses a system of messages and keys to deal with the security problem. To obtain information from a server device, a client device must first request authorization from a Kerberos server. This action triggers a series of encrypted messages which are sent by the Kerberos server to the client and server devices and from the client device to the server device. Eventually, the client device is able to connect to the server device.

Figure 14:
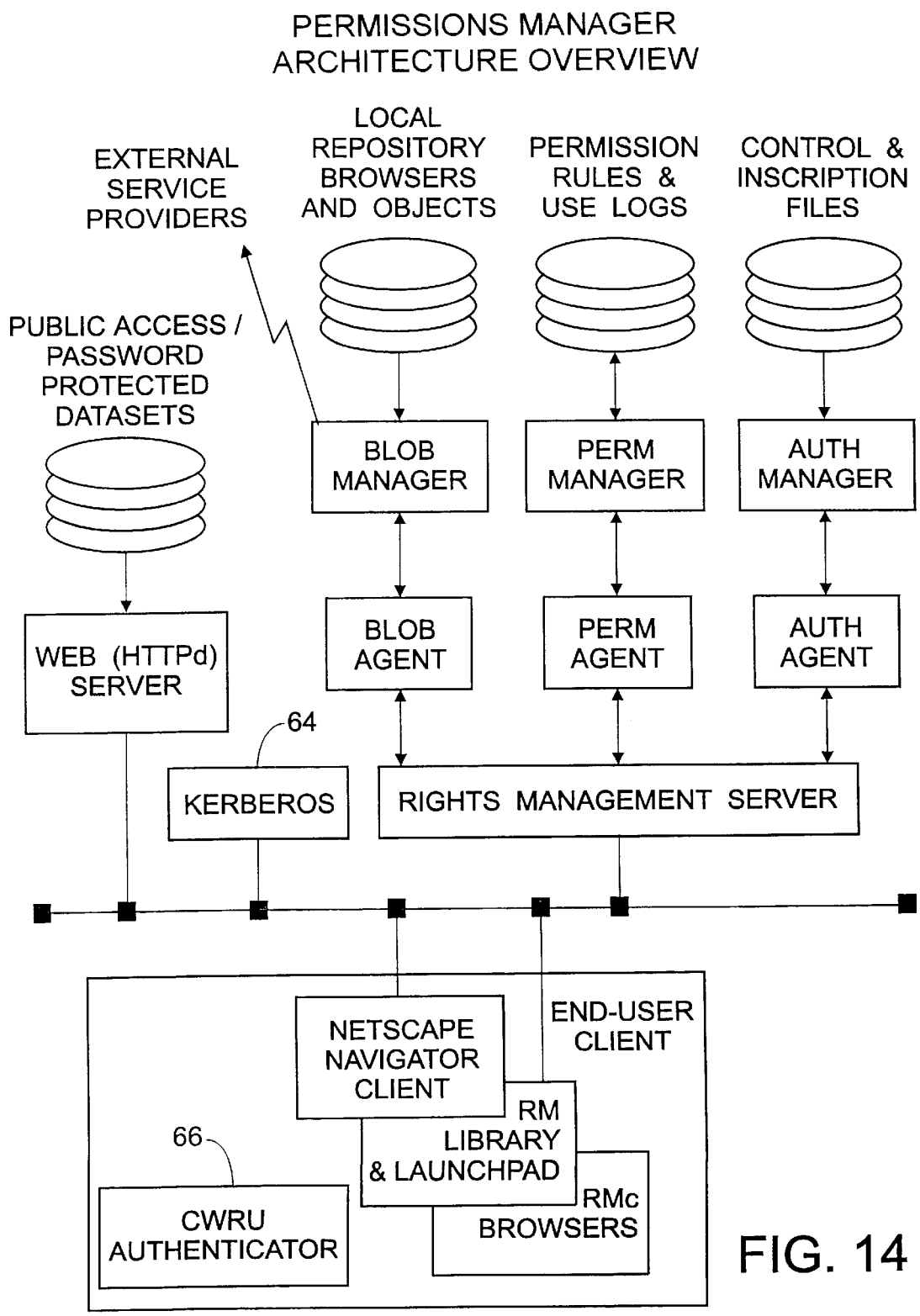

In the present invention, a situation may be considered, as illustrated in FIG. 14, where a pre-existing Kerberos system 64 exists which will validate a user's ID and password allowing the user into a corporate or campus wide system. The present invention essentially allows RM server 10 to accept the Kerberos server as a client. The RM system A provides a password for the Kerberos server and Kerberos code is placed into RMc browsers 36. This allows any user of a Kerberos technology to be authenticated and allows access into the RM system. This is accomplished by including additional software such as shown in FIG. 14 of the overview architecture including authenticator 66 installed on workstation 20. In this embodiment, which can be used by other authentication technologies, once a user logs into the authenticator 66, and has been authenticated with Kerberos 64, then a Kerberos ticket is in existence at workstation 20 which is a result of the logging into the Kerberos server 64. RM system A makes use of that ticket in a RMc browser 36 to authenticate to RM server 10 so that a trust exists for any Kerberos client that has successfully obtained a Kerberos ticket.

There is an additional step where RMc browser 36 contacts Kerberos server 64 to obtain an RM ticket. This is a multi-step process. Initially the general ticket from authenticator 66 is obtained and then any other services in the workstation 20 pick up the general ticket and use that general ticket to get a specific service ticket, in this case the RM ticket. Then, once a user chooses to log on to an RMc browser 36, the user will either be automatically recognized, if the user is logged into authenticator 66 with a Kerberos ID and their standard authenticator ID which they use elsewhere in the system. Alternatively, they can enter an RM user ID password combination if it is stored in the authentication manager 18i.

In order to obtain the incorporation of a separate authentication system such as Kerberos into the RM system, computer administrators will have set up a link between the Kerberos server and the RM server. By such actions essentially you are giving the RM server a Kerberos user ID and a password which it keeps secrets to itself just as a user would.

As an alternative external authentication, public key certificates—such as X509, Public Key Cryptographic Standard (PKCS) number 11 smartcards or cryptographic tokens—can also be used to allow a user access to the RM system. In such situations it is necessary that the public key certificate be signed by a third party certification authority which is trusted by the RM server. By this arrangement, the RM server authenticates only users which the trusted certification authority has approved.

Figure 15:
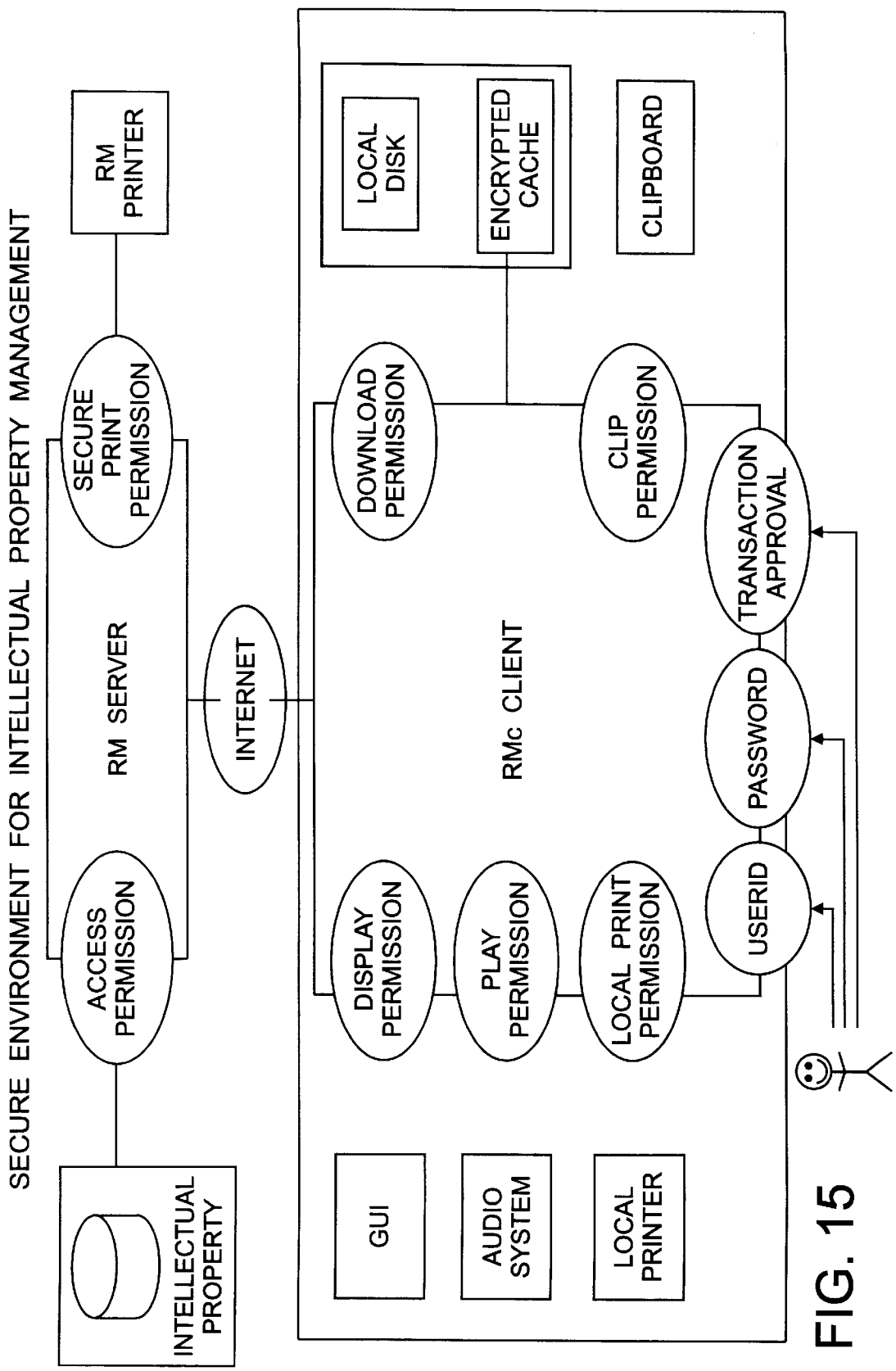

Thus, the RM system provides a secure environment for intellectual property management, as illustrated in FIG. 15. Specifically, RM server 10 when an access permission is received, can obtain the intellectual property stored in a secure fashion. This information can be passed to a RMc workstation 20. Once this information is received, RMc browser 36 of the present invention allows various capabilities dependent upon the user ID password and transactions approval. Specifically, depending upon the level of access, etc. the browser will provide various permissions such as a display, play, local print permission, download permission or clip permission, etc. When a clip permission which allows storage to a local disk is allowed, the browser will ensure that the material stored to the local disk is encrypted data.

The inventors have produced Windows based RMc browsers for the RM system which are integrated with Netscape. When a RM URL is encountered, Netscape passes the request to the RM launch pad. The launch pad contacts the RM Server, identifies the content type (mime type), and requests a RMc browser for that content type. The RM Server starts with a vanilla browser executable and inscribes it with authentication information for a specific instance of that browser. The inscribed browser is sent to the launch pad where it is written to disk and then executed with a command-line argument containing the RM URL. The browser immediately contacts the RM Server, authenticates itself, and requests the intellectual property indicated by the RM URL. The intellectual property is kept resident in the browser's memory. As the user makes use of the intellectual property, the uses are reported to the RM Server. Once a RMc browser is running on the computer the RM launch pad may send it additional RM URLs for mime types that it can handle. When the RMc browser expires, it informs the launch pad and terminates.

The RMc browsers for Windows were built with Microsoft Visual C++. The executable range in size from 200K–300K. For a short expiration interval this adds significant overhead to retrieving new browser instances. It is considered that, intellectual property could be embedded in a Windows executable. The 200K–300K overhead would be unreasonable for encapsulating a 50K image or 10K of HTML.

In an alternative embodiment, Java can be used to encapsulate intellectual property inside a Java based RMc browser with less overhead than a Windows based RMc browser. The rm launch pad itself could not be used since the launch pad could not execute a Java applet within the Java Virtual Machine (JVM) within Netscape or Internet Explorer.

The inherent security features of Java impose constraints on applets. Applets by default may not write to the hard disk. Clipboard operations suffer similar constraints. Printing to a local printer is restricted from within the JVM. These issues must be addressed within Java itself or through a technology to bridge Java applets with other programs executing on the same Machine which could perform these restricted services on behalf of the applet.

The RM Server must inscribe or dynamically compile RM Java applets instead of inscribing Windows executables. First, the server must determine the rights which the user has to a given intellectual property. Then the intellectual property itself must be prepared (watermarking, fingerprinting, . . . ) according the rights. Next, security information must be generated to perform encryption of the information, and intellectual property to produce the RM applet. The applet is then sent to the requesting WWW browser where it is loaded and executed. Uses of the intellectual property must be reported to the RM server.

The invention has been described with reference to the preferred embodiment. It is to be appreciated that the above described functions and means may be performed in an appropriately programmed computer or processor, by dedicated modules, or by a combination thereof. Obviously modifications and alterations will occur to others upon reading and understanding the proceeding detailed description of the preferred embodiment. It is intended that the invention be construed as including all such alterations and modifications insofar as they come within the scope of the appended claims or the equivalents thereof.

Having thus described a preferred embodiment, the invention is now claimed to be:

1. A method for ensuring secure transfer of digitized data from a secure server to an end user using an unsecured client, the method comprising:

storing a launch pad program on the client, wherein normal operation of the client is in a public computer network environment and the client is using a public browser for functioning in the public computer network;

registering an indicator in the public browser;

transferring operational control of the client from the public browser to the launch pad when the indicator is encountered;

sending a request from the launch pad to the secure server for digitized data;

determining a type of secure browser appropriate for the requested digitized data;

determining whether the appropriate secure browser exists on the client;

delivering the secure browser from the secure server to the client when the secure browser is not found on the client; and transferring the requested digitized data to the client through use of the secure browser.

2. The method according to claim 1 further including, inscribing the secure browser with authentication information while at the secure server; and requiring the secure browser to perform authentication operations to the secure server once the secure browser is transferred to the client, prior to the secure browser transferring any digitized data to the client.

3. The method according to claim 1 further including inscribing in the secure browser permission rules which indicate levels of access available to an end user.

4. The method according to claim 1 wherein the secure browser is configured to expire after a predetermined time period.

5. The method according to claim 1 wherein once the secure browser is closed, the secure browser is removed from the client.

6. The method according to claim 1 wherein the end user may be classified as a group of users.

7. The method according to claim 1 wherein an end user is a member of a plurality of groups at least some of the groups having differing levels of permission rules, further including, filtering the differing permission rules; and selecting a desired level of permission rules for the end user.

8. A method of controlling the transfer of digitized intellectual property from a secure Rights Management (RM) server to an unsecured client which uses a World Wide Web (WWW) browser in a Hypertext Transfer Protocol (HTTP) Universal Resource Locator (URL) environment, the method comprising:

loading a launch pad program on the client;

registering, by the launch pad, a RM URL with the WWW browser;

acknowledging a pointer to a RM controlled object causing the WWW browser to turn operational control over to the launch pad;

sending an acknowledgment from the launch pad to the RM server that the launch pad has the capability to handle RM URLs;

sending a client request from the launch pad to the RM server for the RM controlled object;

sending a description of the RM controlled object requested from the RM browser to the launch pad;

transmitting a request from the launch pad to the RM server for a RM browser appropriate for the requested RM controlled object, in response to the description supplied by the RM server;

retrieving by the RM server an appropriate RM browser;

inscribing authentication and security information into the retrieved RM browser;

downloading the requested RM browser to the launch pad;

starting operation of the RM browser by the launch pad including, authenticating the RM browser to the RM server within a predetermined time after starting operation; and delivering the requested RM controlled object to the client by the RM browser.

9. The method according to claim 8 wherein the step of inscribing authentication and security in the RM browser includes, providing a time limited life for the RM browser whereafter the RM browser expires, requiring issuance of a new RM browser.

10. The method according to claim 8 wherein once the RM browser is closed, the RM Browser is removed from the client.

11. The method according to claim 8 wherein in response to the description of the RM browser required for the controlled object sent from the RM server to the launch pad, the launch pad checks a browser table to determine if the requested browser is resident on the client and wherein when the requested browser is on the client, the transmitting, retrieving, inscribing and downloading steps are avoided.

12. The method according to claim 8 wherein the RM browser includes user rights and the controlled object embedded in a browser executable program as data, such that the RM browser must be executed to make use of the controlled object.

13. The method according to claim 8 wherein the controlled object is digitized intellectual property in the form of text, image, audio, video.

14. The method according to claim 9 wherein the expiration time of the RM browser is adjustable.

15. The method according to claim 12 wherein the user rights may vary from one user to the next and a user inherits rights by being a member to a class having certain user rights.

16. The method according to claim 8 further including a step of tracking system usage.

17. The method according to claim 9 further including a step of authenticating a user by supplying a user id to the RM server.

18. The method according to claim 8 further including a step of specifying an encryption level for data that is downloaded to the RM browser.

19. A system for ensuring secure transfer of digitized data from a secure server to an end user using an unsecured client, comprising:

a means for storing a launch pad program on the client, wherein normal operation of the client is in a public computer network environment and the client is using a public browser for functioning in the public computer network;

a means for registering an indicator in the public browser;

a means for transferring operational control of the client from the public browser to the launch pad when the indicator is encountered;

a means for sending a request from the launch pad to the secure server for digitized data;

a means for determining a type of secure browser appropriate for the requested digitized data;

a means for determining whether the appropriate secure browser exists on the client;

a means for delivering the secure browser from the secure server to the client when the secure browser is not found on the client; and a means for transferring the requested digitized data to the client through use of the secure browser.

* * * * *